(12) United States Patent
Kawakami

(10) Patent No.: US 8,347,308 B2
(45) Date of Patent: Jan. 1, 2013

(54) INFORMATION PROCESSING APPARATUS, INFORMATION PROCESSING METHOD, AND STORAGE MEDIUM

(75) Inventor: Shuuhei Kawakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 984 days.

(21) Appl. No.: 12/170,337

(22) Filed: Jul. 9, 2008

(65) Prior Publication Data

US 2009/0019271 A1      Jan. 15, 2009

(30) Foreign Application Priority Data

Jul. 11, 2007   (JP) ................................. 2007-182144

(51) Int. Cl.
 *G06F 9/46* (2006.01)
(52) U.S. Cl. .......................... 718/106; 712/227; 358/1.1
(58) Field of Classification Search .................. 718/106; 712/227; 358/1.1
See application file for complete search history.

(56) References Cited

U.S. PATENT DOCUMENTS

| 6,665,425 B1* | 12/2003 | Sampath et al. ............... 382/112 |
| 2003/0233341 A1* | 12/2003 | Taylor et al. ...................... 707/1 |
| 2006/0179422 A1* | 8/2006 | Gortler .......................... 717/124 |
| 2006/0248302 A1* | 11/2006 | Yamamoto et al. ........... 711/163 |
| 2007/0027733 A1* | 2/2007 | Bolle et al. ........................ 705/7 |

FOREIGN PATENT DOCUMENTS

| CN | 1501298 A | 6/2004 |
| JP | 11-306254 A | 11/1999 |
| JP | 2004-127321 A | 4/2004 |

\* cited by examiner

*Primary Examiner* — Thomas Lee
*Assistant Examiner* — Xuxing Chen
(74) *Attorney, Agent, or Firm* — Canon U.S.A., Inc. IP Division

(57) ABSTRACT

An information processing apparatus having a storage unit configured to execute a workflow with a plurality of processes combined therein and hold history information of the workflow, the information processing apparatus comprising an instructing unit configured to instruct such that a test workflow regarding a workflow selected to be executed is executed; a generating unit configured to generate the test workflow for the workflow selected to be executed; and an executing unit configured to execute the test workflow; wherein the generating unit generates the test workflow at least by adding a process not held in history information to processes of the test workflow, without adding a process held in the history information to the processes of the test workflow.

4 Claims, 16 Drawing Sheets

| USER ID | USER NAME | PASSWORD | MANAGING USER FLAG |
|---|---|---|---|
| admin | SYSTEM MANAGER | adminpss | 1 |
| user01 | John P. User | User01pass | 0 |

402  403  404  405

1: MANAGING USER
0: GENERAL USER

| WORKFLOW ID | WORKFLOW NAME | MANAGING USER | EXECUTING USER | WORKFLOW DEFINITION | CHANGING TIME |
|---|---|---|---|---|---|
| f0001 | PRINT SCAN TRANSMISSION | admin | user01 | SCAN→SMB TRANSMISSION (¥¥svr01¥foler01)→PRINTING | 05/10/2005 11:50:50 |
| f0002 | PRINT SAVING | admin | user01 | SCAN→PRINT→BOX STORAGE (BOX01) | 05/10/2005 12:08:34 |

| TEST RULE ID | STEP TYPE | TEST PROCESS | CHANGING TIME |
|---|---|---|---|
| wf0001 | SMB TRANSMISSION | SMP SERVER ACCESS TEST SMB FOLDER ACCESS RIGHT TEST | 05/08/2005 09:50:50 |
| wf0002 | MAIL TRANSMISSION | SMTP SERVER ACCESS TEST | 05/08/2005 09:51:03 |
| wf0003 | BOX STORAGE | BOX ACCESS RIGHT TEST | 05/08/2005 09:52:10 |

| TEST WORKFLOW ID | WORKFLOW ID | EXECUTING USER | TEST WORKFLOW DEFINITION | CHANGING TIME | EXECUTING TIME |
|---|---|---|---|---|---|
| tf0001 | f0001 | user01 | SCAN→SMB SERVER ACCESS TEST (svr01)→SMB FOLDER ACCESS RIGHT TEST (folder01) | 05/11/2005 10:30:45 | 05/11/2005 10:30:55 |
| tf0002 | f0002 | user01 | SCAN→PRINT→BOX ACCESS RIGHT TEST (BOX01) | 05/11/2005 08:28:43 | |

FIG. 4E

| HISTORY ID | EXECUTING USER | PROCESSING HISTORY | PROCESSING TIME |
|---|---|---|---|
| h0001 | user01 | SMB TRANSMISSION (¥¥svr01¥folder01) | 05/09/2005 21:21:32 |
| h0002 | user01 | BOX STORAGE (BOX01) | 05/09/2005 22:06:01 |

FIG. 4F

W: WRITABLE
R: READABLE

| BOX ID | BOX NAME | MANAGING USER | USING USER | ACTUAL FOLDER | CHANGING TIME |
|---|---|---|---|---|---|
| bx0001 | BOX01 | admin | user01(W) | ¥¥svr01¥user¥box¥bx0001 | 05/11/2005 10:35:20 |
| bx0002 | BOX02 | admin | user01(R) | ¥¥svr01¥user¥box¥bx0002 | 05/11/2005 07:21:44 |

FIG. 4G

| ERROR ID | STEP TYPE | ERROR CONTENT | HANDLING CONTENT |
|---|---|---|---|
| e0001 | SMB TRANSMISSION | SMB SERVER ACCESS UNABLE | PLEASE VERIFY NETWORK CONNECTION |
| e0002 | BOX STORAGE | NO ACCESS RIGHT | NO BOX RIGHT. PLEASE CONTACT BOX MANAGER. |

FIG. 13

EXECUTE TEST WORKFLOW

TEST WORKFLOW WILL BE EXECUTED.
PLEASE SELECT TEST WORKFLOW TO EXECUTE, AND PRESS OK.

| | WORKFLOW ID | WORKFLOW NAME | WORKFLOW CONTENT |
|---|---|---|---|
| ● | f0001 | PRINT SCAN TRANSMISSION | SCAN→ SMB TRANSMISSION→ PRINT |
| ○ | f0002 | STORE PRINTING | SCAN→PRINT→Box STORAGE |
| ○ | f0003 | EMAIL FAX | SCAN→EMAIL TRANSMISSION→ FAX TRANSMISSION |
| ○ | f0004 | FAX PRINTING | SCAN→FAX TRANSMISSION→PRINT |

[ CANCEL ]   [ OK ]

FIG. 14

AUTHENTICATE TEST WORKFLOW RE-EXECUTION

THE SELECTED TEST WORKFLOW HAS ALREADY BEEN EXECUTED.
RE-EXECUTE TEST WORKFLOW?

- WORKFLOW ID: f0001
- WORKFLOW NAME: PRINT SCAN TRANSMISSION
- WORKFLOW CONTENT: SCAN→SMB TRANSMISSION→PRINT
- FINAL EXECUTE DATE AND TIME: 05/21/2005 10:33:55

[ CANCEL ]   [ OK ]

FIG. 18

STORAGE MEDIUM SUCH AS FD/CD-ROM

| DIRECTORY INFORMATION |
|---|
| FIRST PROCESSING PROGRAM<br>PROGRAM CODING GROUP CORRESPONDING TO<br>STEPS IN WORKFLOWCHART SHOWN IN FIG. 5 |
| SECOND PROCESSING PROGRAM<br>PROGRAM CODING GROUP CORRESPONDING TO<br>STEPS IN WORKFLOWCHART SHOWN IN FIG. 6 |
| THIRD PROCESSING PROGRAM<br>PROGRAM CODING GROUP CORRESPONDING TO<br>STEPS IN WORKFLOWCHART SHOWN IN FIG. 7 |
| FOURTH PROCESSING PROGRAM<br>PROGRAM CODING GROUP CORRESPONDING TO<br>STEPS IN WORKFLOWCHART SHOWN IN FIG. 8 |
| FIFTH PROCESSING PROGRAM<br>PROGRAM CODING GROUP CORRESPONDING TO<br>STEPS IN WORKFLOWCHART SHOWN IN FIG. 9 |
| SIXTH PROCESSING PROGRAM<br>PROGRAM CODING GROUP CORRESPONDING TO<br>STEPS IN WORKFLOWCHART SHOWN IN FIG. 10 |
|  |
|  |

INFORMATION PROCESSING APPARATUS, INFORMATION PROCESSING METHOD, AND STORAGE MEDIUM

BACKGROUND OF THE INVENTION

1. Field of the Invention

The present invention relates to processing of an information processing apparatus which executes a workflow wherein specific processes are combined.

2. Description of the Related Art

Heretofore, with a system including an image processing apparatus or information processing apparatus, a workflow system has been proposed to execute a processing sequence with multiple processes combined such as scanning, printing, and file storage to a Box.

With the workflow system mentioned above, generally an administrator of the workflow system (hereafter referred to as "administrator") defines the workflow, a user who uses the workflow system (hereafter, user) specifies the workflow defined by the administrator and executes the workflow.

Also, there has been a data processing work advancing managing system which saves the history of the advancement status of data processing work actually executed with each client apparatus, and has a function wherein a workflow information setting apparatus sets new workflow information based on the history. Note that such a data processing work advancing management system is disclosed in Japanese Patent Laid-Open No. 11-306254.

Also, rules for the workflow are stored beforehand, and when a workflow execution command arrives, the workflow is executed with rules applied thereto. Also, when a workflow simulation executing command arrives, the workflow is not actually executed, and a virtual execution wherein the rules are applied is executed.

Thus, there has been a workflow assistance system wherein the workflow can confirm whether or not to exempt a rule. Note that that such a workflow assistance system is disclosed in Japanese Patent Laid-Open No. 2004-127321. However, the workflow executed in the above-mentioned workflow system is a processing sequence configured with multiple processes.

Accordingly, in the case that a user executes a workflow defined by the administrator, e.g. an error occurs in the last process, the entire processing sequence ends in error, whereby the processing up to immediately before the last process is wasted.

Accordingly, in order to avoid the waste wherein the entire workflow becomes an error from the processing error of the process, the workflow defined by the administrator needs to be tested, thereby increasing administrator workload.

On the other hand, with a workflow setting apparatus such as that disclosed in Japanese Patent Laid-Open No. 11-306254, a new workflow based on history can be set from the history of the advancement status of data processing work executed with each client apparatus in the past. However, the user executing the workflow has not been able to know whether or not the created workflow can be properly executed.

On the other hand, with a workflow assistance system such as that in Japanese Patent Laid-Open No. 2004-127321 performs virtual execution of the workflow, the user can confirm whether or not the workflow is adhering to the rules. However, processing which cannot be determined with a virtual execution such as the existence of access right is included in the workflow processing, whereby there has been concern that this cannot be handled with Japanese Patent Laid-Open No. 2004-127321.

SUMMARY OF THE INVENTION

The present invention is directed to the above-mentioned problem, and provides an arrangement whereby a minimal test workflow combining specific processes is created and executed.

According to an embodiment of the present invention, the information processing apparatus of the present invention is an information processing apparatus having a storage unit configured to execute a workflow with a plurality of processes combined therein and hold history information of the workflow, the information processing apparatus including: an instructing unit configured to instruct such that a test workflow regarding a workflow selected to be executed is executed; a generating unit configured to generate the test workflow for the workflow selected to be executed; and an executing unit configured to execute the test workflow; wherein the generating unit generates the test workflow at least by adding a process not held in history information to processes of the test workflow, without adding a process held in the history information to the processes of the test workflow.

Further features of the present invention will become apparent from the following description of exemplary embodiments with reference to the attached drawings.

BRIEF DESCRIPTION OF THE DRAWINGS

FIG. 4 is a diagram to describe the data configuration of the various types of information processed with the data processing system shown in FIG. 1.

FIG. 13 is a diagram illustrating an example of a user interface which can be displayed with the image forming apparatus according to the present embodiment.

FIG. 14 is a diagram illustrating an example of a user interface which can be displayed with the image forming apparatus according to the present embodiment.

FIG. 18 is a diagram to describe a memory map of a storage medium storing various types of data processing program which is readable by the image forming apparatus relating to the present invention.

DESCRIPTION OF THE EMBODIMENTS

Figure 1:
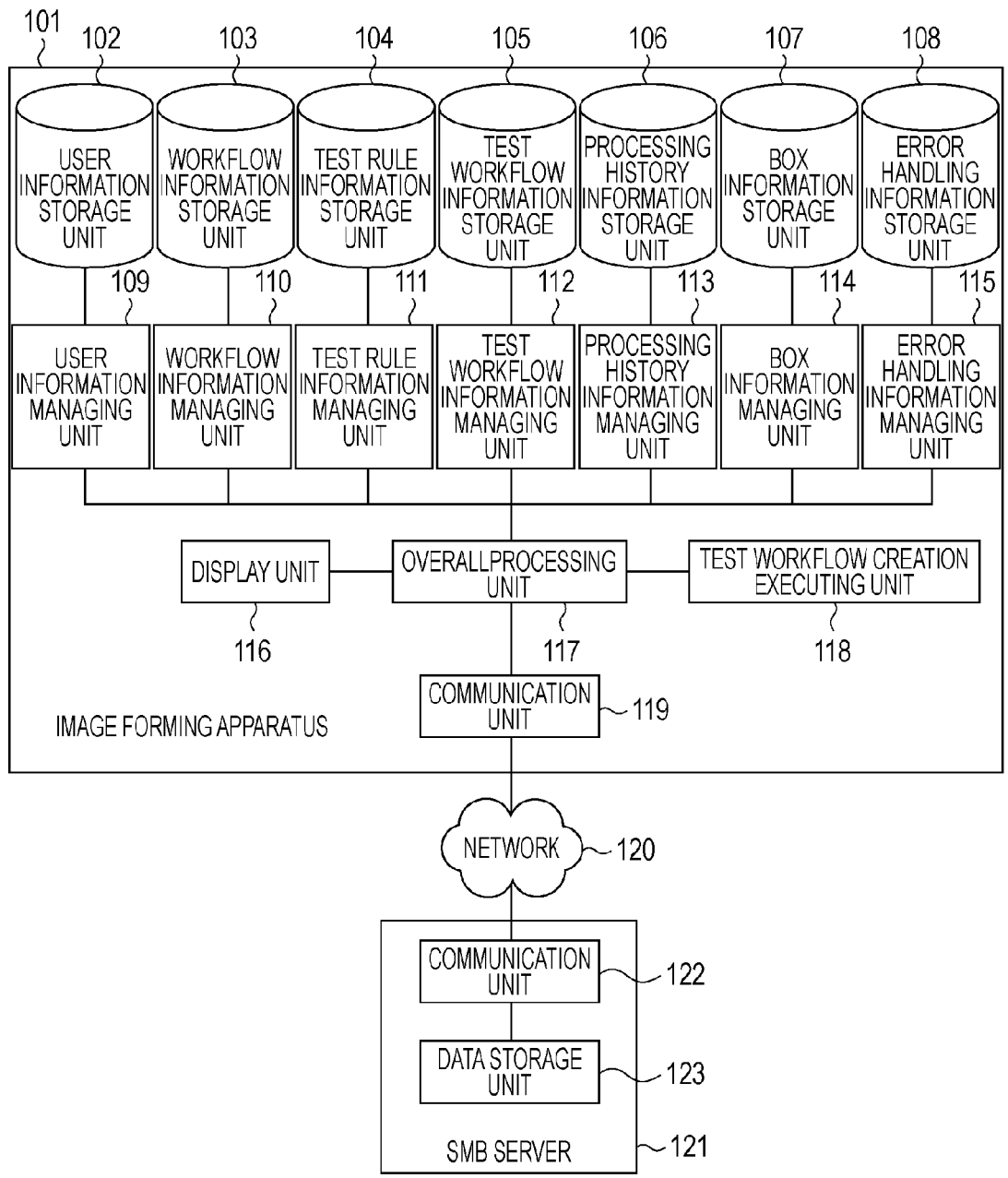
FIG. 1 is a block diagram illustrating a configuration of an information processing system according to an embodiment of the present invention.

Next, embodiments of the invention will be described with reference to the diagrams.
Description of System Configuration First Embodiment Overall Configuration Diagram of Workflow Test System First, the configuration of the present workflow test system will be described with reference to FIG. 1. FIG. 1 is a block diagram illustrating a configuration of an information processing system including an information processing apparatus according to a first embodiment of the present invention. The present example is a system wherein an image forming apparatus 101 and an SMB server 121 which communicates with an SMB (Server Message Block) protocol can communicate via a network 120. Note that with the present embodiment, the image forming apparatus 101 will be described as an example of the information processing apparatus, but other apparatuses, e.g. combination image forming apparatus or printing device, can be applicable with the present invention.

In FIG. 1, the image forming apparatus 101 provides functions to define and execute workflow and create and execute test workflow. The SMB server 121 provides a function to store file data received from the image forming apparatus 101.

Here, FIG. 1 shows the SMB server 121 as an example of a server apparatus, but a file server other than SMB protocol may be used. Also, in the case that the workflow executed with the image forming apparatus 101 does not include file transmission, the SMB server 121 does not need to exist in the workflow system.

The image forming apparatus 101 has a user information storage unit 102, workflow information storage unit 103, test rule information storage unit 104, test workflow information storage unit 105, processing history information storage unit 106, and BOX information storage unit 107. Further, the image forming apparatus 101 has an error handling information storage unit 108, user information managing unit 109, workflow information managing unit 110, test rule information managing unit 111, test workflow information managing unit 112, and processing history information managing unit 113.

Figure 2:
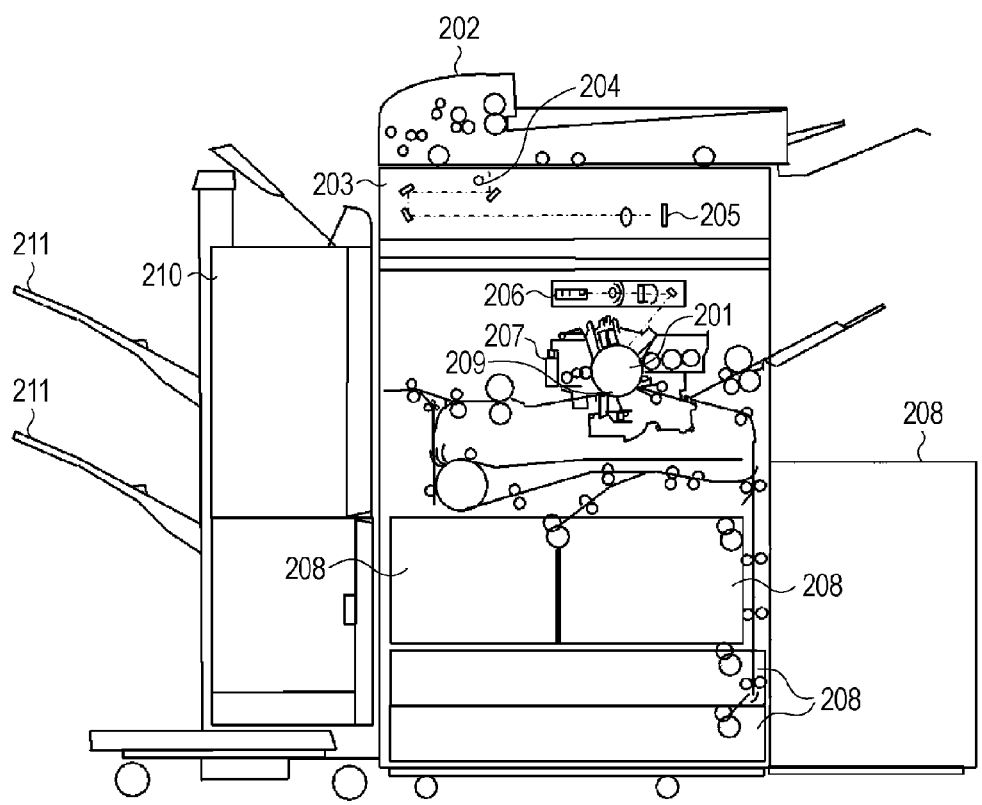
FIG. 2 is a cross-sectional diagram illustrating an engine configuration of the image forming apparatus shown in FIG. 1.

Further, the image forming apparatus 101 has a BOX information managing unit 114, error handling information managing unit 115, display unit 116, overall processing unit 117, test workflow creation executing unit 118, and communication unit 119. Note that the image forming apparatus 101 has hardware and software such as will be described later. Also, in FIG. 1, the engine configuration of the image forming apparatus 101 is omitted, but has an engine configuration as shown in FIG. 2.

The user information storage unit 102 is provided within an HDD 313 (shown in FIG. 3) to be described later, and has a function to store user information which can be used to log in to the image forming apparatus 101.

The user information is information such as a user ID, user name, password, and managing user flag. The user information managing unit 109 manages the user information stored in the user information storage unit 102, and has a function to read the user information as to the user ID from the user information storage unit 102 employing the user ID received from the overall processing unit 117.

The workflow information storage unit 103 is provided in the later-described HDD 313 (shown in FIG. 3), and has a function to store the workflow defining information which can be executed with the image forming apparatus 101.

The workflow defining information here is for example, workflow ID, workflow name, managing user, executing user, workflow definition, and changing time.

The workflow information managing unit 110 manages the workflow information stored in the workflow information storage unit 103. The workflow information managing unit 110 has a function to store the workflow information received from the overall processing unit 117 to the workflow information storage unit 103.

Also, the workflow information managing unit 110 has a function to use the user ID received from the overall processing unit 117 and read the workflow information having managing user as the user ID from the workflow information storage unit 103.

Also, the workflow information managing unit 110 has a function to use the user ID received from the overall processing unit 117 and read the workflow information having executing user as the user ID from the workflow information storage unit 103.

Also, the workflow information managing unit 110 has a function to read the workflow information of the workflow ID received from the overall processing unit 117 from the workflow information storage unit 103.

The test rule information storage unit 104 is provided in the later-described HDD 313 (shown in FIG. 3), and has a function to store test rules to be used in the event of creating a test workflow from the workflow with the image forming apparatus 101.

The test rule information is information such as test rule ID, step type, test process, and changing time.

The test rule information managing unit 111 manages the test rule information stored in the test rule information storage unit. That is to say, the test rule information managing unit 111 has a function to use the workflow information received from the overall processing unit 117 and read the test rule information by step type corresponding to the processes within the workflow from the test rule information storage unit 104.

Test workflow information storage unit 105 is provided in the later-described HDD 313 (shown in FIG. 3), and has a function to store the test workflow definition information which can be executed with image forming apparatus 101. The test workflow information is information such as test workflow ID, workflow ID, executing user, test workflow definition, changing time, and executing time.

The test workflow information managing unit 112 manages the test workflow information stored in the test workflow information storage unit 105. The test workflow information managing unit 112 has a function to store the test workflow information received from the overall processing unit 117 to the test workflow information storage unit 105. Also, the test workflow information managing unit 112 has a function to user the user ID received from the overall processing unit 117 and read the test workflow information with an executing user as the user ID from the test workflow information storage unit 105.

Also, the test workflow information managing unit 112 has a function to read the test workflow information of the test workflow ID received from the overall processing unit 117 from the test workflow information storage unit 105.

The processing history information storage unit 106 is provided in the later-described HDD 313 (shown in FIG. 3), and has a function to store history information of the processing executed in the past. Processing history information is information such as history ID, executing user, processing history, and processing time.

The processing history information managing unit 113 manages the processing history information stored in the processing information storage unit 106. The processing history information managing unit 113 has a function to store the processing history information received from the overall processing unit 117 to the processing history information storage unit 106.

Also, the processing history information managing unit 113 employs the user ID received from the overall processing unit 117 as the executing user, and has a function to read the processing history information from the processing history information storage unit 106.

The BOX information storage unit 107 is provided in the later-described HDD 313 (FIG. 3), and has a function to store information of the BOX which can store file document on the image forming apparatus 101. Note that Box indicates a storage region for storing files and so forth. BOX information includes information such as BOX ID, BOX name, managing user, using user, actual folder, and access right.

The BOX information managing unit 114 manages BOX information stored in the BOX information storage unit 107. The BOX information managing unit 114 has a function to use the BOX name received from the overall processing unit 117 to read the BOX information corresponding to the BOX name from the BOX information storage unit 107. Also, the BOX information managing unit 114 has a function to store the BOX information received from the overall processing unit 117 to the BOX information storage unit 107.

The error handling information managing unit 108 is provided in the later-described HDD 313 (FIG. 3), and has a function to store information for handling by the user as to errors occurring on the image forming apparatus 101. Error handling information is information such as error ID, step type, error content, and handling content.

The error corresponding information managing unit 115 manages the error handling information stored in the error handling information storage unit 108, and reads the error handling information as to the error content received from the overall processing unit 117 from the error handling information storage unit 108.

The display unit 116 has a function to display a later-described login screen 1101 (shown in FIG. 11), workflow definition screen 1201 (shown in FIG. 12), and test workflow executing screen 1301 (shown in FIG. 13) to a later-described CRT 309 (shown in FIG. 3). Also, the display unit 116 has a function to display the test workflow re-executing screen 1401 (shown in FIG. 14) and test workflow execution result screen 1501 (shown in FIG. 15) on the later-described CRT 309 (shown in FIG. 3). Also, the display unit 116 has a function to display the error handling screen 1601 (shown in FIG. 16) and device processing screen 1701 (shown in FIG. 17) on the later-described CRT 309 (shown in FIG. 3).

The overall processing unit 117 has a function to perform workflow definition processing, test workflow creating executing processing, and device processing. The overall processing unit 117 performs processing as described below for the workflow definition processing. The overall processing unit 117 requests the display unit 116 to display the later-described login screen 1101 (shown in FIG. 11).

The overall processing unit 117 obtains the user ID and password input by the user on the later-described login screen 1101 (shown in FIG. 11), and sends the user ID to the user information managing unit 109. The overall processing unit 117 requests the user information managing unit 109 to read the user information corresponding to the user ID, stored in the user information storage unit 102.

Authentication is performed with user information thus received, and in the case authentication succeeds, requests the display unit 116 to display the later-described workflow definition screen 1201 (shown in FIG. 12).

Also, the workflow definition information input by the user in the later-described workflow definition screen 1201 (shown in FIG. 12) is sent to the workflow information managing unit 110, and the workflow information is requested to be stored in the workflow information storage unit 103.

Test Workflow Creating Processing

The overall processing unit 117 performs processing such as described below regarding test workflow creating executing processing. The overall processing unit 117 requests the display unit 116 to display the later-described login screen 1101 (shown in FIG. 11).

The user ID and password input by the user on the login screen 1101 (shown in FIG. 11) are obtained. The user ID is sent to the user information managing unit 109, and requests the user information managing unit 109 to read the user information corresponding to the user ID which is stored in the user information storage unit 102.

Authentication is performed with user information thus received, and in the case authentication succeeds, determination is made as to whether or not the user having logged in is a managing user from the user information. In the case that the user is the managing user, the display unit 116 is requested to display the later-described test workflow executing screen 1301 (shown in FIG. 13).

In the case that the user instructs test execution with the later-described test workflow executing screen 1301 (shown in FIG. 13), the test workflow creating executing unit 118 is requested to create a test workflow. Next, the test workflow creating executing unit 118 is requested to execute the test workflow.

The overall processing unit 117 performs processing such as described below for the device processing. The overall processing unit 117 performs processing as described below for the workflow defining processing.

The display unit 116 is requested to display the later-described login screen 1101 (shown in FIG. 11). The user ID and password input by the user at the login screen 1101

(shown in FIG. 11) is obtained. The user ID is sent to the user information managing unit 109 and the user information managing unit 109 is requested to read the user information corresponding to the user ID, stored in the user information storage unit 102.

Authentication is performed with user information thus received, and in the case authentication succeeds, the display unit 116 is requested to display the later-described processing executing screen 1701 (shown in FIG. 17).

The overall processing unit 117 determines whether or not the processing input by the user on the later-described processing executing screen 1701 (shown in FIG. 17) has succeeded. In the case determination is made that the processing has succeeded, the processing results are sent to the processing history information managing unit 113, and the processing history information storage unit 106 is requested to store the processing results.

The test workflow creating executing unit 118 has a function to perform test workflow creating processing and test workflow executing processing. The test workflow creating executing unit 118 performs processing as described below regarding test workflow creating processing.

The test workflow creating executing unit 118 sends the workflow information received from the overall processing unit 117 to the test workflow information managing unit 112, and requests the test workflow information managing unit 112 to read the test workflow information corresponding to the workflow information stored in the test workflow information storage unit 105.

In the case that the test workflow information is received, the overall processing unit 117 determines whether or not a BOX operation is included in the process of the test workflow.

In the case the overall processing unit 117 determines that a BOX operation is included in the process of the test workflow, the overall processing unit 117 sends the user information and BOX information to the BOX information managing unit 114. The BOX information managing unit 114 is requested to read the BOX information corresponding to that which is stored in the BOX information storage unit 107.

The overall processing unit 117 determines whether or not the executing user has changed from the changing time of the read BOX information, and if there is no change, the test workflow is not executed. Thus, a process not changed does not need to be executed.

On the other hand, in the case the test workflow information is not read, one process at a time is read from the workflow information in sequence, and the test rule information managing unit 111 is requested to read the test rule corresponding to the process, stored in the test rule information storage unit 104.

Next, the test rule information received from the test rule information managing unit 111 is used to convert to a test process.

Further, the test process after conversion is added to the test workflow. After converting all of the processes of the workflow information are converted to test workflow, the created test workflow is sent to the test workflow information managing unit 112, and requests the test workflow information managing unit 112 to send this to the test workflow information storage unit 105.

Test Workflow Executing Processing

The test workflow creation executing unit 118 performs processing such as described below regarding test workflow executing processing.

The test workflow creation executing unit 118 determines whether or not the test workflow information received from the overall processing unit 117 is already executed. In the case determination is made that the test workflow information is already executed, the display unit 116 is requested to display the later-described test workflow re-executing screen 1401 (shown in FIG. 14).

Also, in the case that the user instructed the test workflow to be re-executed, the test workflow creation executing unit 118 executes all of the processes of the test workflow one process at a time in sequence. In the case the execution of the test workflow is ended, the display unit 116 displays the later-described test workflow executing result screen 1501 (shown in FIG. 15).

Further, in the case that the test workflow results in an error, the test workflow creation executing unit 118 sends the error content to the error handling information managing unit 115, and requests the test workflow creation executing unit 118 to read the error information as to the error content stored in the error handling information storing unit 108. Upon receiving the error information, the error handling information storing unit 108 sends the received error information to the display unit 116 and requests the display unit 116 to display the later-described error handling screen 1601 (shown in FIG. 16).

The communication unit 119 has a function to send the user information and folder information received from the overall processing unit 117 to the communication unit 122 and to request the communication unit 122 to send the access right information.

Also, the communication unit 119 has a function to send the access right information received from the communication unit 122 to the overall processing unit 117. Also, the communication unit 119 has a function to send the file data received from the overall processing unit 117 to the communication unit 122 and to perform file data storage requests.

Also, the communication unit 119 has a function to send the file data received from the communication unit 122 to the overall processing unit 117. The SMB server 121 has a communication unit 122 and data storage unit 123.

The communication unit 122 has a function to send the user information and folder information received from the communication unit 119 to the data storage unit 123, and to request reading of the access right information.

Also, the communication unit 122 has a function to send the access right information received from the data storing unit 123 to the communication unit 119. Also, the communication unit 122 has a function to send the file data received from the communication unit 119 to the data storage unit 123 and request file data storage to the data storage unit 123.

Further, the communication unit 122 has a function to send the file information received from the communication unit 119 to the data storage unit 123, receive the file data corresponding to the file information from the data storage unit 123, and send the received file data to the communication unit 119.

The data storage unit 123 has a function to read the access right information corresponding to the user information and folder information received from the communication unit 119 and send this to the communication unit 122. Also, the data storage unit 123 has a function to store the file data received from the communication unit 122. Also, the data storage unit 123 has a function to read the file data corresponding to the file information received from the communication unit 122 and send this to the communication unit 122.

Configuration Diagram of Image Forming Apparatus

Next, the image forming apparatus 101 will be described with reference to FIG. 2. FIG. 2 is a cross-sectional diagram showing an engine configuration of the image forming apparatus 101 shown in FIG. 1. In FIG. 2, the image forming apparatus 101 has a print engine 201, document feeder (DF) 202, document reading unit 203, light source 204, CCD 205, and laser recording unit 206. Also, the image forming apparatus 101 has a controller 207, sheet cassette 208, fusing unit 209, finisher 210, and discharge tray 211.

With the present embodiment, the image forming apparatus 101 shows an example of a digital multifunction device. The digital multifunction has functions for each of copying, printing, and faxing. The print engine 201 is a print engine for monochrome printing recording. Note that the engine may be a color printing engine.

The document feeder (DF) 202, document reading unit 203, light source 204, CCD 205, laser recording unit 206, sheet cassette 208, fusing unit 209, finisher 210, and discharge tray 211 are accessories.

Upon loading a document face up on the document feeder (DF) 202 and pressing the start key, the document is transported to the upper face of the document reading unit 203. The document is irradiated with the light source 204, the reflected light thereof is read by the CCD 205, and converted to a digital signal. Desired image processing is performed with the controller 207 and the digital signal is then converted to a laser recording signal. The recording signal is converted to the recording laser with the laser recording unit 206, irradiated by a photoconductor, and a latent image is formed on the photoconductor.

Toner developing is performed, toner is transferred to a transfer sheet supplied from the sheet cassette 208, and the toner is fused thereto with the fusing unit 209 and discharged to the finisher 210.

With the finisher 210, various types of operations are performed according to the functions specified by the operator. Specifically, the finisher 210 has various types of functions such as stapling.

There are two discharge trays 211, and based on the setting of the image forming apparatus 101, the discharge trays can be assigned according to the function such as copying, printing, and faxing.

In the case that the print engine 201 is employed as a printer, the settings described below can be made with the settings of the image forming apparatus 101. Note that in the case that the engine of the image forming apparatus 101 has a color printing engine, the image forming apparatus 101 has functions to perform the various types of settings such as monochrome printing/color printing, sheet size, duplex, stapling, start page numbers, and so forth.

The controller 207 functions as a central processing device which performs various types of control and computations of the image forming apparatus 101. Also, the controller 207 has a function as a memory to save an application program, various types of data, and so forth. The application program according to the present embodiment is a software program to execute various types of processing. The details of the controller 207 will be described with reference to FIG. 3.

Configuration Diagram of Image Forming Apparatus 101 Controller and SMB Server 121

Next, the configuration of the controller 207 of the image forming apparatus 101 and SMB server 121 will be described with reference to FIG. 3. FIG. 3 is a block diagram showing the configuration of the controller 207 of the image forming apparatus and SMB server 121 shown in FIG. 1. Note that the configurations for the controller 207 of the image forming apparatus 101 and SMB server 121 are the same. Also, the controller 207 of the image forming apparatus 101 and the SMB server 121 have the blocks shown in FIG. 3.

Figure 3:
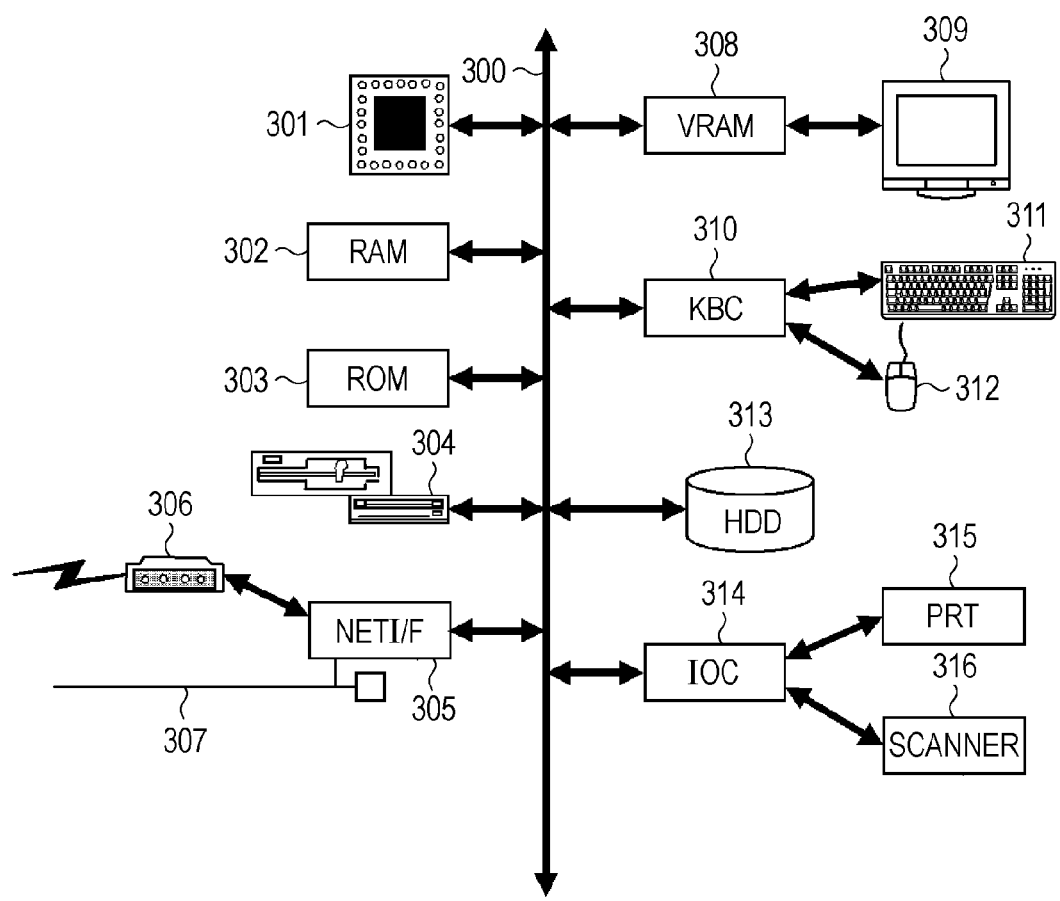
FIG. 3 is a block diagram willing a configuration of a controller and SMB server of the image forming apparatus shown FIG. 1.

In FIG. 3, 301 denotes a CPU, and a RAM 302, ROM 303, external storage medium reading/writing unit 304, NET interface 305 are connected via a system bus 300. Also, the CPU 301 is connected to a VRAM 308, KBC 310, HDD 313, IOC 314, and the units thereof via the system bus 300. The system bus 300 is a transmission path to transmit data and control information between the various units.

The CPU 301 has a function as a central processing device performing various types of control and computations for the controller 207 of the image forming apparatus 101 and SMB server 121.

The RAM 302 is a random access memory, and provides an executing program storage region, program executing region, and data storage region as the primary memory of the CPU 301.

The ROM 303 is dedicated read-only memory which has the operation processing sequences of the CPU 301 stored therein. The ROM 303 stores a basic program (generally called BIOS) to perform controls of the various units in the controller 207 of the image forming apparatus 101 and SMB server 121 and information necessary to operate the system.

The external storage medium reading/writing unit 304 is a unit group to perform data input/output of a removable external storage medium such as a floppy (registered trademark) (®) disk and CD-ROM.

The NET interface 305 is a network interface, and connects to an external network via a modem 306 or connects to a LAN 307.

The NET interface 305 performs controls to perform data transfer between the other devices including the controller 207 of the image forming apparatus 101 and the SMB server 121 via the network 120, and diagnostics on connection status.

A modem 306 is made up of a terminal adapter (TA) for modem or ISDN connection to connect an external network with the controller 207 of the image forming apparatus 101 and SMB server 121 via a telephone circuit.

A LAN 307 is a network system such as Ethernet (registered trademark). With the present embodiment, the controller 207 of the image forming apparatus 101 and SMB server 121 are connected to the network 120 via the modem 206. Note that an arrangement may be made wherein the controller 207 of the image forming apparatus 101 and SMB server 121 is connected to the network 120 via a communication device connected on the LAN 307 such as a router or gateway.

The VRAM 308 is a video RAM, and expands image data to be displayed on the CRT 309 and performs display control. A liquid crystal display device or the like may be employed instead of the CRT 309.

The KBC 310 is a controller which controls an input signal from a keyboard 311 or mouse 312. Instead of the keyboard 311, a software keyboard or the like on the liquid crystal display device may be employed. Also, instead of the mouse 312, a touch panel or the like on the liquid crystal display device may be employed.

The HDD 313 is a hard disk drive, and is employed as memory which stores application programs, various types of data, and so forth. An application program according to the present embodiment is a software programs which executes various types of processing.

An IOC 314 is to control a printer 315 and scanner 316, and may be connected to external input/output devices other than the printer 315 or scanner 316, such as an external connection HDD or MO drive or the like. Diagram Showing User Information, Workflow Information, Test Rule Information, Test Workflow Information, Processing History Information, BOX Information, Error Handling Information FIG. 4 is a diagram describing the data configuration for various types of information processed with the data processing system shown in FIG. 1. In FIG. 4, the user information is made up from a user information database 401, as shown in FIG. 4A. The rows in the database 401 indicate user information. Note that the user information shown in FIG. 4A is stored in the user information storage unit 102 of the image forming apparatus 101.

The data in each column of the database 401 show user ID 402, user name 403, password 404, managing user flag 405, and so forth. Also, with the data indicated with the managing user flag 405, "1" denotes that the user is the managing user, and "0" denotes that the user is a general user. Thus, whether or not the user logged in is a managing user can be specified.

With the present embodiment, the data shown in the database 401 is one example, and more databases may be provided. Also, other additional information (user right, user affiliation, user address, user contact information, and so forth) may be stored in the database 401.

Further, with the present embodiment, each record of the database 401 is stored in a storage device in database format. However, it goes without saying that these records may be stored in the storage device in file format.

The workflow information is made up of a workflow information database 406, as shown in FIG. 4B. The rows in the database 406 show workflow information. Note that the workflow information shown in FIG. 4B is workflow information stored in the workflow information storage unit 103.

The data in each column of the database 406 show workflow ID 407, workflow name 408, managing user 409, executing user 410, workflow definition 411, changing time 412, and so forth.

With the present embodiment, the data shown in the database 406 is one example, and more databases may be provided. Also, other additional information (workflow definition type, executing time, and so forth) may be stored in the database 401. Also, the data in the workflow definition 411 shown in the database 406 is one example, and workflow definition 411 may be written in document format such as XML.

Further, with the present embodiment, each record of the database 406 is stored in a storage device in database format. However, it goes without saying that these records may be stored in the storage device in file format.

The test rule information is made from a test rule information database 413, as shown in FIG. 4C. The rows in the database 413 show test rule information.

Note that the test rule information shown in FIG. 4C is test rule information stored in the test rule information storage unit 104 of the image forming apparatus 101.

The data in each column of the database 413 indicate test rule ID 414, step type 415, test process 416, changing time 417, and so forth. With the present embodiment, the data shown in the database 415 is one example, and more databases may be provided.

Also, other additional information (information such as test rule type, test rule defining user, version ID and so forth) may be stored in the database 413. Also, the data of the test process 416 shown in the database 413 is an example, and the test process 416 may be written in document format such as XML.

Further, with the present embodiment, each record of the database 413 is stored in a storage device in database format. However, it goes without saying that these records may be stored in the storage device in file format.

The test workflow information is made up from a test workflow information database 418, as shown in FIG. 4D. The rows in the database 418 show test workflow information. Note that the test workflow information shown in FIG. 4D is test workflow information stored in the test workflow information storage unit 105 of the image forming apparatus 101.

The data in each column of the database 418 shows test workflow ID 419, workflow ID 420, executing user 421, test workflow definition 422, changing time 423, executing time 424, and so forth. With the present embodiment, the data shown in the database 418 is one example, and more databases may be provided.

Also, other additional information (information such as test workflow type, defining user and so forth) may be stored in the database 418. Also, the data of the test workflow definition 422 shown in the database 418 is an example, and the test workflow definition 422 may be written in document format such as XML.

Further, with the present embodiment, each record of the database 418 is stored in a storage device in database format. However, it goes without saying that these records may be stored in the storage device in file format.

The processing history information is made up from a processing history information database 425, as shown in FIG. 4E. The rows in the database 425 show processing history information. Note that the processing history information shown in FIG. 4E is processing history information stored in the processing history information storage unit 106 of the image forming apparatus 101.

The data in each column of the database 425 show a history ID 426, executing user 427, processing history 428, processing time 429, and so forth. With the present embodiment, the data shown in the database 425 is one example, and more databases may be provided.

Also, other additional information (information such as processing history type, processing time and so forth) may be stored in the database 425. Also, the data is the processing history 428 shown in the database 425 is an example and the processing history 428 may be written in document format such as XML.

Further, with the present embodiment, each record of the database 425 is stored in a storage device in database format. However, it goes without saying that these records may be stored in the storage device in file format.

BOX information is made up from a BOX information database 430, as shown in FIG. 4F. The rows in the database 430 shows BOX information. Note that the BOX information shown in FIG. 4F is BOX information stored in the BOX information storage unit 107 of the image forming apparatus 101.

The data in each column of the database 430 shows BOX ID 431, BOX name 432, managing user 433, using user 434, actual folder 435, changing time 436, and so forth. With the present embodiment, the data shown in the database 430 is one example, and more databases may be provided.

Also, other additional information (information such as BOX type, BOX creation time, BOX operating history, BOX capacity, maximum number of files, current number of files, and so forth) may be stored in the database 430.

Further, with the present embodiment, each record of the database 430 is stored in a storage device in database format. However, it goes without saying that these records may be stored in the storage device in file format.

Error handling information is made up from an error handling information database 437, as shown in FIG. 4G. The rows in the database 437 show error handling information. Note that the error handling information shown in FIG. 4G is error handling information stored in the error handling information storage unit 108 of the image forming apparatus 101.

The data in each column of the database 437 shows an error ID 438, step type 439, error content 440, handling content 441, and so forth. With the present embodiment, the data shown in the database 437 is one example, and more databases may be provided.

Also, other additional information (information such as error handling type, error handling definition time, error handling history, and so forth) may be stored in the database 437. Also, the data of the error content 440 and handling content 441 is shown in the database 437 is one example, but the error content 440 and handling content 441 may be written in document format such as XML.

Further, with the present embodiment, each record of the database 437 is stored in a storage device in database format. However, it goes without saying that these records may be stored in the storage device in file format.

Flowchart at Image Forming Apparatus for Workflow Definition

Figure 5:
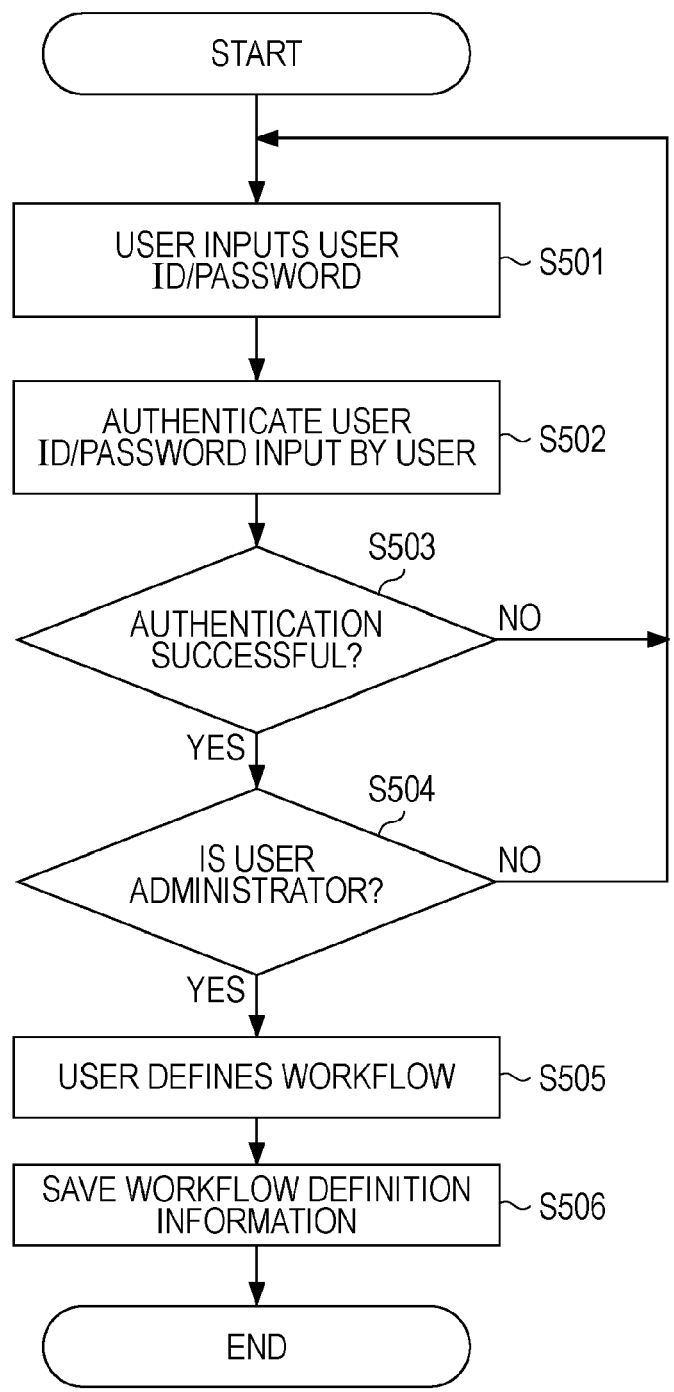
FIG. 5 is a flowchart showing an example of a first data processing sequence with the image forming apparatus according to the present embodiment.

Next, workflow defining processing by the image forming apparatus 101 will be described with reference to FIG. 5. FIG. 5 is a flowchart showing an example of a first data processing sequence with the image forming apparatus according to the present embodiment. The present example is a sequence example of workflow defining procedures by the image forming apparatus 101 shown in FIG. 1. Note that S501 through S506 denote each step. Also, each step is realized by executing a control program loaded in the RAM 302 with the CPU 301 shown in FIG. 3.

First, the overall processing unit 117 requests the display unit 116 to display the later-described login screen 1101 (shown in FIG. 11).

Next, a user inputs a user ID 1102 and a password at the password input box 1103 on the later-described login screen 1101 (shown in FIG. 11), and presses an OK button 1104. According to such user processing, the overall processing unit 117 obtains the password and user ID.

The overall processing unit 117 sends the obtained user ID to the user information managing unit 109, and requests the user information managing unit 109 to read the user information corresponding to the user ID.

The user information managing unit 109 reads the user information corresponding to the received user ID from the user information storage unit 102, and sends this to the overall processing unit 117.

The overall processing unit 117 uses the received user information and the password input by the user in step S501 to perform authentication of the user ID and password (S502).

The overall processing unit 117 determines whether or not the authentication has succeeded (S503). Specifically, the user information corresponding to the user ID obtained in step S501 is stored in the user information storage unit 102, and in the case that the password of the read user information and the password input by the user match, the overall processing unit 117 determines that authentication has succeeded. On the other hand, otherwise, the overall processing unit 117 determines that authentication has failed, and returns the flow to step S501.

In the case determination is made in step S503 that authentication has succeeded, the overall processing unit 117 determines whether or not the user logged in is the administrator (S504). Specifically, in the case the overall processing unit 117 determines that the managing user flag in the obtained user information is "0", the user is determined to be a general user, and the flow is returned to step S501.

On the other hand, in the case the overall processing unit 117 determines that the managing user flag is "1", the user is determined to be an administrator, and the flow is advanced to step S505.

The overall processing unit 117 requests the display unit 116 to display a later-described workflow definition screen 1201 (shown in FIG. 12). Next, in step S505, the user performs workflow defining on the later-described workflow defining screen 1201 (shown in FIG. 12), and presses the OK button 1210. In accordance with the user operation, the overall processing unit 117 obtains the workflow defined by the user.

Next, the overall processing unit 117 sends the obtained workflow definition information to the workflow information managing unit 110 and requests the workflow information managing unit 110 to store the workflow definition information in the workflow information storage unit 103.

In step S506, the workflow information managing unit 110 stores the received workflow definition information in the workflow information unit 103, sends information to the effect that storing has been performed to the overall processing unit 117, and the present processing is ended.

Flowchart at Image Forming Apparatus for Test Workflow Creation Execution

Figure 6:
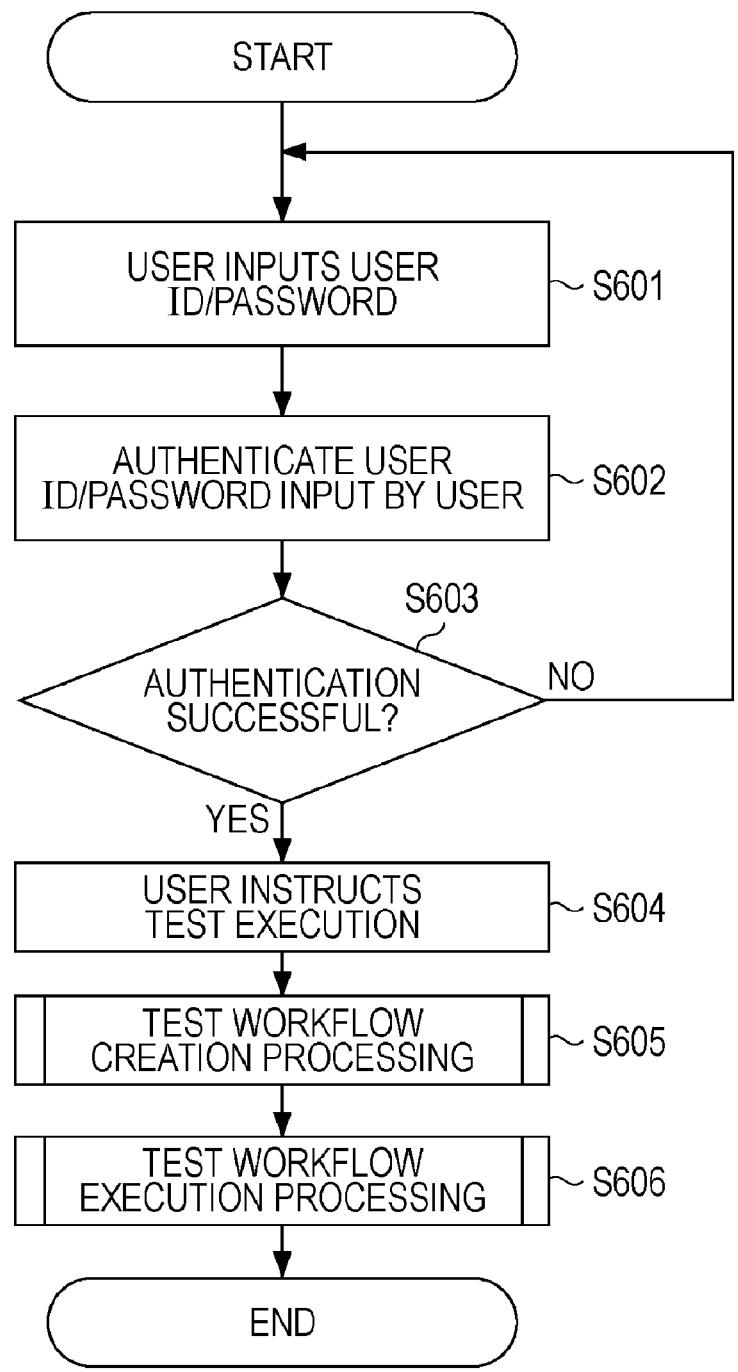
FIG. 6 is a flowchart showing an example of a second data processing sequence with the image forming apparatus according to the present embodiment.

Next, workflow defining processing by the image forming apparatus 101 will be described with reference to FIG. 6. FIG. 6 is a flowchart showing an example of a second data processing sequence with the image forming apparatus according to the present embodiment. The present example is a sequence example of test workflow creation execution processing by the image forming apparatus 101. Note that S601 through S606 denote each step. Also, each step is realized by executing a control program loaded in the RAM 302 with the CPU 301 shown in FIG. 3.

First, the overall processing unit 117 requests the display unit 116 to display the later-described login screen 1101 (shown in FIG. 11).

Next, in step S601, the user inputs a user ID 1102 and a password at the password input box 1103 in the later-described login screen 1101 (shown in FIG. 11), and presses the OK button 1104. In accordance with the user operations, the overall processing unit 117 obtains a user ID and password. The overall processing unit 11 sends the obtained user ID to the user information managing unit 109, and requests the user information managing unit 109 to read the user information corresponding to the user ID.

The user information managing unit 109 reads the user information corresponding to the received user ID from the user information from the storage unit 102, and sends this to the overall processing unit 117.

The overall processing unit 117 uses the received user information and the password input by the user in step S601 to perform authentication of the user ID and password.

Next, in step S603, the overall processing unit 117 determines whether or not user information corresponding to the user ID obtained in step S601 is stored in the user information storage unit 102, and whether the password in the read user information matches the password input by the user. In the case the overall processing unit 117 determines that these match, the authentication is determined to be a success, in the case the overall processing unit 117 determines that these so not match, the authentication is determined to be a failure.

The overall processing unit 117 sends the user information received in step S602 to the workflow information managing unit 110. Further, the overall processing unit 117 requests the workflow information managing unit 110 to read the workflow information corresponding to the user information obtained in step S602 of the workflow information stored in the workflow information storage unit 103. That is to say, the workflow to be executed based on the logged in user is read.

The workflow information managing unit 110 reads the workflow information corresponding to the user information received from the overall processing unit 117 out of the workflow information stored in the workflow information storage unit 103. The workflow information managing unit 110 sends the read workflow information to the overall processing unit 117.

The overall processing unit 117 sends the received workflow information to the display unit 116, and requests the display unit 116 to display the later-described test workflow executing screen 1301 (shown in FIG. 13). The user selects the workflow to be executed on the later-described test workflow executing screen 1301 (shown in FIG. 13), and presses the OK button 1306.

In accordance with the user operation, the overall processing unit 117 instructs a test to be executed for the workflow selected by the user (S604).

Next, the overall processing unit 117 obtains the workflow information specified in step S604. The overall processing unit 117 sends the obtained workflow information to the test workflow creation executing unit 118, and requests the test workflow creation executing unit 118 to create the test workflow, whereby the test workflow creation executing unit 118 creates a test workflow for the workflow (S605).

Upon the test workflow creation processing ending, the test workflow creation executing unit 118 sends information to the effect that the test workflow creation processing has ended to the overall processing unit 117, and the workflow is advanced to step S606. Note that step S605 is a sub-routine, and the details of the processing in step S605 will be described with reference to FIG. 7.

Next, in step S606, the overall processing unit 117 requests the test workflow creation executing unit 118 to execute the test workflow, and the test workflow creation executing unit 118 executes the test workflow. Upon the test workflow executing processing ending, the test workflow creation executing unit 118 sends information to the effect that the test workflow executing processing has ended to the overall processing unit 117, and the processing is ended.

Note that step S606 is a sub-routine, and the details of the processing in step S606 will be described with reference to FIG. 8.

Flowchart of Sub-Routine to Create Test Workflow

Next, the test workflow creation processing with the image forming apparatus 101 will be described with reference to FIG. 7.

Figure 7:
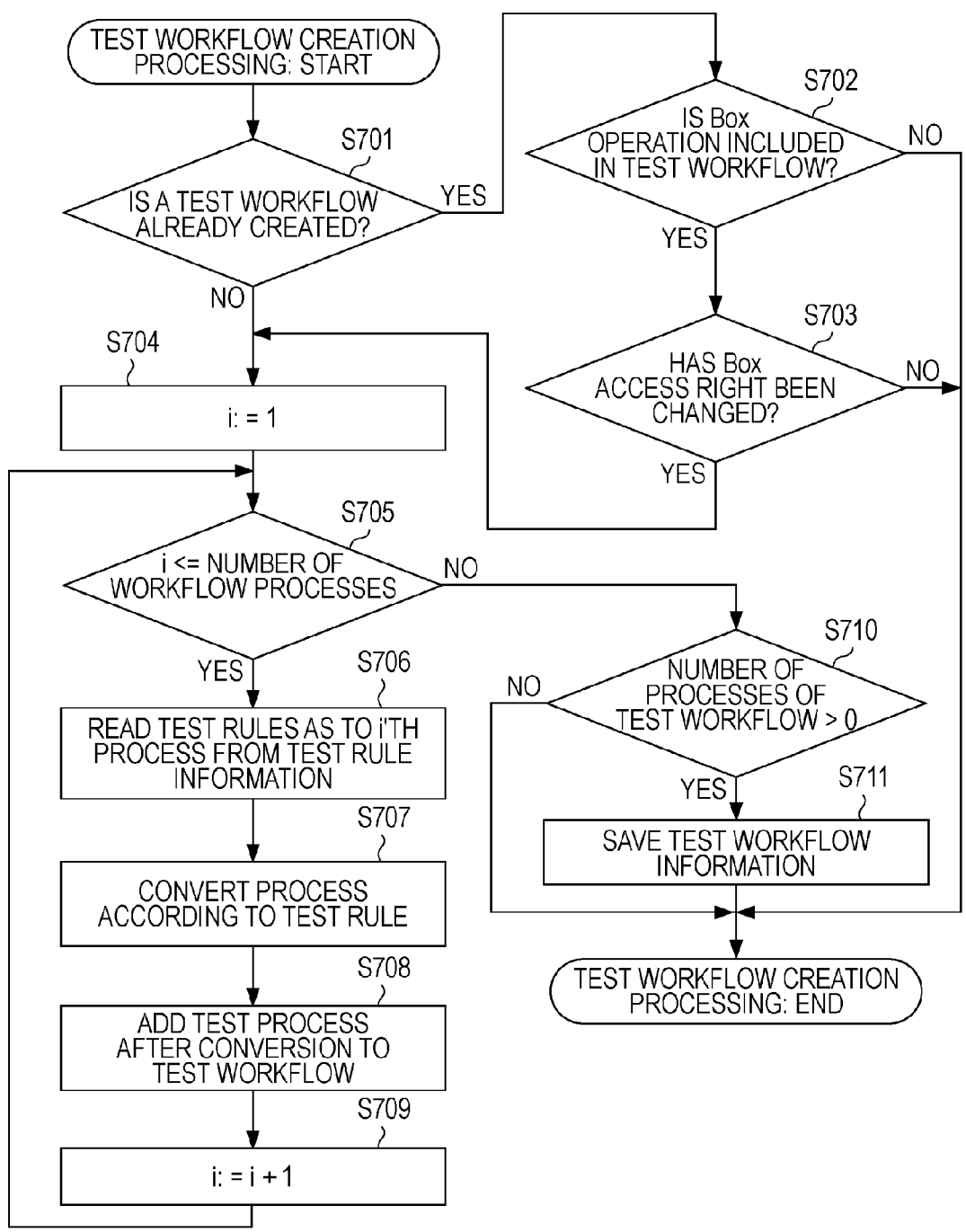
FIG. 7 is a flowchart showing an example of a third data processing sequence with the image forming apparatus according to the present embodiment.

FIG. 7 is a flowchart showing an example of a third data processing sequence with the image forming apparatus according to the present embodiment. The present example is a sequence example of test workflow creation processing by the image forming apparatus 101. Also, the test workflow creation processing with the image forming apparatus 101 in FIG. 7 is a sub-routine processing applicable to step S606 in the description of FIG. 6.

Note that S701 through S706 denote each step. Also, each step is realized by executing a control program loaded in the RAM 302 with the CPU 301 shown in FIG. 3.

First, the test workflow creation executing unit 118 sends the workflow information received from the overall processing unit 117 to the test workflow information managing unit 112, then requests the test workflow information managing unit 112 to read the test workflow information as to the workflow information.

The test workflow information managing unit 112 reads the test workflow information corresponding to the workflow ID of the received workflow information from the test workflow information storage unit 105, and sends this to the test workflow creation executing unit 118.

Next, the test workflow creation executing unit 118 determines whether or not a test workflow has been created in accordance to the workflow information received from the overall processing unit 117 (S701).

In the case the test workflow creation executing unit 118 determines that the test workflow information readout result received from the test workflow information managing unit 112 is successfully read, the test workflow is determined to be already created, and the workflow is advanced to step S702.

On the other hand, in the case the test workflow creation executing unit 118 determines in step S701 that the test workflow information readout result received from the test workflow information managing unit 112 is not successfully read, the test workflow is determined to not have been created, and the workflow is advanced to step S704. Here, we assume that the test workflow creation executing unit 118 has determined that there is already a test workflow created, and the workflow is advanced to step S702.

In step S702, the test workflow creation executing unit 118 references the test workflow definition of the test workflow information received in step S701, and determines whether or not a BOX operation is included in the process of the workflow definition shown in the test workflow definitions. In the case the test workflow creation executing unit 118 determines that a BOX operation is included in the test workflow definitions, the workflow is advanced to step S703.

On the other hand, in the case the test workflow creation executing unit 118 determines in step S702 that a BOX operation is not included in the test workflow definitions, the present processing is ended. That is to say, a test workflow already created is employed to execute the test processing.

In the case determination is made in step S702 that a BOX operation is included, following the test workflow received in step S701 being executed in the past, the test workflow creation executing unit 118 determines whether or not the access right of the BOX has been changed (S703).

First, the test workflow creation executing unit 118 references the executing time of the test workflow received in step S701. In the case there is a test workflow executing time, the test workflow creation executing unit 118 obtains a BOX for the BOX operation of the workflow information received from the overall processing unit 117 in step S701.

Next, the test workflow creation executing unit 118 sends the obtained BOX information to the BOX information storage unit 107, and requests the BOX information managing unit 114 to read the BOX information corresponding to the BOX name of the BOX information from the BOX information storage unit 107.

The test workflow creation executing unit 118 reads the BOX information corresponding to the BOX name in the received BOX information from the BOX information storage unit 107, and sends this to the test workflow creation executing unit 118.

Next, the test workflow creation executing unit 118 compares the changing time of the received BOX information (including access right) and the executing time of the test workflow information received in step S701.

In the case that there is an executing time of the test workflow received in step S701, and the executing time is later than the changing time of the BOX information, the test workflow creation executing unit 118 determines that the access right of the BOX has not been changed, and the process is ended.

On the other hand, in the case that the test workflow executing time is before the changing time of the BOX information, the access right of the BOX is determined to have been changed.

On the other hand, in the case that the test workflow creation executing unit 118 determines that the BOX access right has been changed, the processing is advanced to step S704.

In step S704, the test workflow creation executing unit 118 initializes the value of a pointer variable i indicating a process to configure the workflow definitions of the workflow information received in step S701 to "1", and the workflow is advanced to step S705.

Next, in step S705, the test workflow creation executing unit 118 determines whether or not the value of a pointer variable i indicating a process to configure the workflow definitions is at or less than the number of processes of the workflow definition.

In the case that the test workflow creation executing unit 118 determines that the value of the pointer variable i indicating a process to configure the workflow definitions is at or less than the number of processes of the workflow definition, the workflow is advanced to step S706.

On the other hand, in the case that the test workflow creation executing unit 118 determines that the value of the pointer variable i indicating a process to configure the workflow definitions is not at or less than the number of processes of the workflow definition, the workflow is advanced to step S710.

Here, we assume that the test workflow creation executing unit 118 has determined that the value of the pointer variable i indicating a process to configure the workflow definitions is at or less than the number of processes of the workflow definition, and the workflow is advanced to step S706.

In step S706, the test workflow creation executing unit 118 sends the i'th process information of the workflow definition of the workflow information received in step S701 to the test rule information managing unit 111. Further, the test workflow creation executing unit 118 requests the test rule information managing unit 111 to read the test rule information having a step type corresponding to the processing of the i'th process.

The test rule information managing unit 111 reads test rule information having a step type corresponding to the i'th process from the test rule information storage unit 104 and sends this to the test workflow creation executing unit 118, and the workflow is advanced to step S707.

Next, in step S707, the test workflow creation executing unit 118 converts the i'th process of the workflow definitions of the workflow information received in step S701 into a test process for the test rule information received in step S706, and the workflow is advanced to step S708.

In step S708, the test workflow creation executing unit 118 adds the data process converted in step S707 to the test workflow, and the workflow is advanced to step S709.

Next, in step S709, the test workflow creation executing unit 118 increments the value of the pointer variable i indicating the process making up the workflow definitions by "1", and returns the workflow to step S705.

On the other hand, in the case determination is made in step S705 that the value of the pointer variable i is not at or less than the number of workflow processes, the test workflow creation executing unit 118 determines in step S710 whether or not the number of test workflow processes created by adding a test process in step S708 is greater than "0".

In the case that the test workflow creation executing unit 118 determines that the number of test workflow processes created by adding a test process in step S708 is greater than "0", the workflow is advanced to step S711.

On the other hand, in the case that the test workflow creation executing unit 118 determines that the number of test workflow processes created by adding a test process in step S708 is not greater than "0", the processing is ended.

Here, let us assume that the test workflow creation executing unit 118 has determined that the number of test workflow processes created by adding a test process in step S708 is greater than "0", so the flow is advanced to step S711.

The test workflow creation executing unit 118 sends the test workflow for a workflow to be executed, which is created by adding the test process in step S708, to the test workflow information managing unit 112, and requests the test workflow information managing unit 112 to store this in the test workflow information storage unit 105.

In step S711, the test workflow information managing unit 112 stores the received test workflow information in the test workflow information storage unit 105, sends information to the effect that storage is performed to the test workflow creation executing unit 118, and the workflow is ended.

Flowchart of Sub-Routine to Execute Test Workflow

Next, the test workflow executing processing with the image forming apparatus 101 will be described with reference to FIG. 8. FIG. 8 is a flowchart showing an example of a fourth data processing sequence with the image forming apparatus showing the present embodiment. The present example is a sequence example of test workflow executing processing by the image forming apparatus 101.

Figure 8:
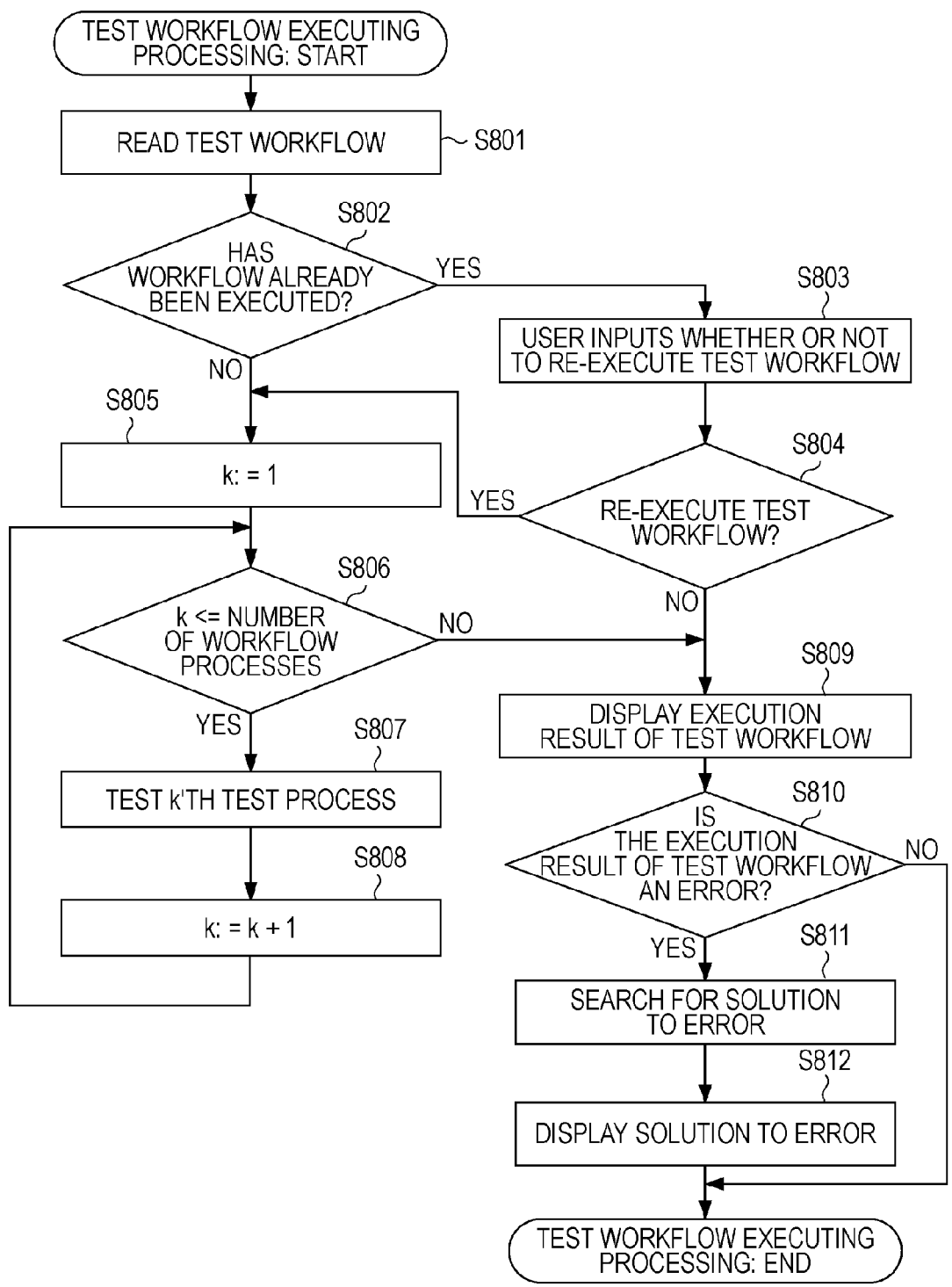
FIG. 8 is a flowchart showing an example of a fourth data processing sequence with the image forming apparatus according to the present embodiment.

Also, the test workflow executing processing with the image forming apparatus 101 in FIG. 8 is a sub-routine processing applicable to step S606 in the description of FIG. 6. Note that S801 through S806 denote each step.

Also, each step is realized by executing a control program loaded in the RAM 302 with the CPU 301 shown in FIG. 3.

With the image forming apparatus 101, as shown in FIG. 8, first the test workflow creation executing unit 118 sends the workflow information received from the overall processing unit 117 to the test workflow information managing unit 112.

Further, the test workflow information managing unit 112 is requested to read the test workflow corresponding to the workflow ID from the test workflow information storage unit 105.

In step S801, the test workflow information managing unit 112 reads the test workflow corresponding to the workflow ID of the workflow information received from the test workflow creation executing unit 118 from the test workflow information storage unit 105, sends this to the test workflow creation executing unit 118, and the workflow is advanced to step S802.

In step S802, the test workflow creation executing unit 118 references the executing time of the test workflow information received in step S801, and in the case that a value of an executing time exists, the test workflow creation executing unit 118 determines that a test workflow already has been executed, and the workflow is advanced to step S803.

On the other hand, in step S802, in the case that the test workflow creation executing unit 118 references the executing time of the test workflow information received in step S801 and determines that there is no executing time value, the test workflow creation executing unit 118 determines that a test workflow has not yet been executed, and the workflow is advanced to step S805.

The test workflow creation executing unit 118 requests the display unit 116 to display a later-described test workflow re-executing screen 1401 (shown in FIG. 14).

Next, in step S803, in the case that the user presses the OK button 1406 or cancel button 1407 on the later-described test workflow re-executing screen 1401 (shown in FIG. 14), the flow is advanced to step S804.

Next, in step S804, the test workflow creation executing unit 118 determines whether or not the user has instructed to re-execute the test workflow in step S803. In the case that the user has pressed the OK button 1406 on the later-described test workflow re-executing screen 1401 (shown in FIG. 14), the test workflow creation executing unit 118 determines that test workflow re-executing has been instructed, and the flow is advanced to step S805.

On the other hand, in the case that the user presses the cancel button 1407 on the later-described test workflow re-executing screen 1401 (shown in FIG. 14), the test workflow creation executing unit 118 determines that test workflow re-executing has not been instructed. The workflow is then advanced to step S809.

Here, we assume that the test workflow creation executing unit 118 has determined that the user instructed re-executing of the test workflow, and the flow is advanced to step S805.

Next, in step S805, the test workflow creation executing unit 118 initializes the value of the pointer variable k indicating a test process making up a test workflow definition to "1", and the flow is advanced to step S806.

In step S806, the test workflow creation executing unit 118 determines whether or not the value of the pointer variable k indicating a test process making up a test workflow definition is at or less than the number of processes of the test workflow definition read in step S801.

In the case that the test workflow creation executing unit 118 determines that the value of the pointer variable k indicating a test process making up a test workflow definition is at or less than the number of processes of the test workflow definition read in step S801, the flow is advanced to step S807.

On the other hand, in the case that in step S806 the test workflow creation executing unit 118 determines that the value of the pointer variable k indicating a test process making up a test workflow definition is not at or less than the number of processes of the test workflow definition read in step S801, the flow is advanced to step S809.

Here, we assume that the value of the pointer variable k indicating a test process making up a test workflow definition is at or less than the number of processes of the test workflow definition read in step S801, and the flow is advanced to step S807.

In step S807, the test workflow creation executing unit 118 executes the k'th test process of the test workflow definitions of the test workflow information read in step S801. The flow is then advanced to step S808.

Next, in step S808, the test workflow creation executing unit 118 adds "1" to increment the value of the pointer variable k indicating a test process making up the test workflow definition, and the flow is returned to step S806.

On the other hand, in the case that determination is made in step S804 not to re-execute the test workflow, the test workflow creation executing unit 118 sends the workflow ID of the test workflow information read in step S801 and the current time to the test workflow information managing unit 112.

Further, the test workflow creation executing unit 118 requests the test workflow information managing unit 112 that the current time be stored in the executing time of the test workflow information corresponding to the test workflow ID which is stored in the test workflow information storage unit 105. The test workflow information managing unit 112 stores the current time in the executing time of the test workflow information corresponding to the test workflow ID stored in the test workflow information storage unit 105, and sends information to the effect that storage has been performed to the test workflow creation executing unit 118.

Next, in step S809, the test workflow creation executing unit 118 sends the executing result of the test process tested in step S807 to the display unit 116, and requests the display unit 116 to display the later-described test workflow executing result screen 1501 (shown in FIG. 15), and the flow is advanced to step S810.

In step S810, the test workflow creation executing unit 118 determines whether or not the executing result of the test process tested in step S807 is an error. Here, in the case that the test workflow creation executing unit 118 determines that the test process executing result is an error, the flow is advanced to step S811. Thus, the test workflow creation executing unit 118 performs error determination as to whether the executing result is an error.

On the other hand, in the case that the test workflow creation executing unit 118 determines that the executing result of the test process tested in step S807 is not an error, the processing is ended.

Here we assume that the test workflow creation executing unit 118 determines that the test process executing result is an error, and the flow is advanced to step S811.

The test workflow creation executing unit 118 sends the test process of which the executing result in step S807 is an error to the error handling information managing unit 115. In step S811, the test workflow creation executing unit 118 requests the error handling information managing unit 115 to read the error handling information by step type corresponding to the test process of which the executing result is an error from the error handling information storage unit 108.

The error handling information managing unit 115 reads the received error handling information by step type corresponding to the test process, and sends the read error handling information to the test workflow creation executing unit 118. The flow is then advanced to step S812.

Next, in step S812, the test workflow creation executing unit 118 sends the error handling information read in step S811 to the display unit 116, and requests the display unit 116 to display the later-described error handling screen 1601 (shown in FIG. 16), and the processing is ended.

Note that the method of error communication may be a method other than sending the error handling information to the display unit 116 and displaying.

Thus, a workflow test execution can be performed on the workflow system. Thus, the user can know which of the multiple processes making up the workflow is a process having a problem with execution, and further can know whether or not the workflow can be properly executed. Also, since the test workflow is generated according to each user instructing the workflow test execution, the burden on the administrator can be reduced.

According to the present embodiment, a new workflow is not created from the stored history information, but a test workflow can be created for the user to execute, whereby the user can know whether or not the workflow can be properly executed.

Also, the user can know not only whether the workflow rules are being adhered to, but also the user can test execute the workflow, so the user can know whether or not the workflow can be properly executed.

Also, in the case that the workflow includes storing to a Box or file transmission to the SMB server, the access right for the Box and SMB server is different for each user, so the workflow had needed to be tested for each user so that the administrator can confirm whether or not the workflow can be properly executed.

By employing the present embodiment, an executing user instructs testing to generate a test workflow, whereby the burden on the administrator can be reduced.

Various types of user interfaces which can be displayed on the display unit 116 of the image forming apparatus 101 showing the present embodiment will be described below.

Login Screen

Next, the login screen 1101 will be described with reference to FIG. 11. FIG. 11 is a diagram showing an example of a user interface which can be displayed with the image forming apparatus showing the present embodiment. The present example is an example of a login screen displayed on the image forming apparatus 101.

The display processing of this screen is executed by the display unit 116 based on a command from the CPU 301. A keyboard 311, mouse 312, and so forth are employed for input operation by the user on the present screen.

Figure 11:
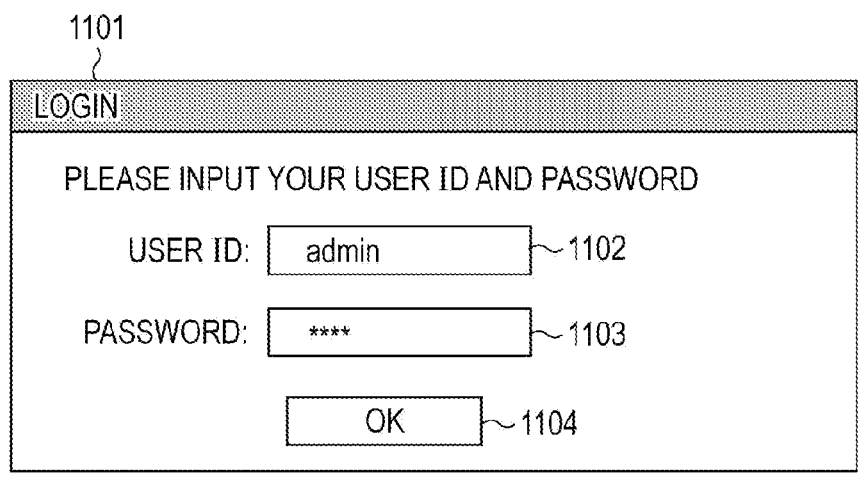
FIG. 11 is a diagram illustrating an example of a user interface which can be displayed with the image forming apparatus according to the present embodiment.

With FIG. 11, a user ID input box 1102, password input box 1103, OK button 1104 and so forth are displayed on the login screen 1101. Also, for example as user information, a user group input box, user affiliation input box and so forth may be added to the login screen 1101.

The user ID input box 1102 is an input box for inputting the user ID in the user information as to the image forming apparatus 101. The input user ID is employed by the overall processing unit 117 for user authentication.

The password input box 1103 is an input box for inputting the password in the user information as to the image forming apparatus 101. The input password is employed by the overall processing unit 117 for user authentication.

The OK button 1104 is a button for the user to instruct the image forming apparatus 101 to perform user authentication employing the user ID and password. Upon the OK button 1104 being pressed, the user ID input in the user ID input box 1102 and the password input in the password input box 1103 are obtained with the overall processing unit 117 as user information.

In the case that a user authentication result determined by the overall processing unit 117 is an authentication failure, information to the effect that this is an authentication failure is displayed on the login screen 1101.

Figure 17:
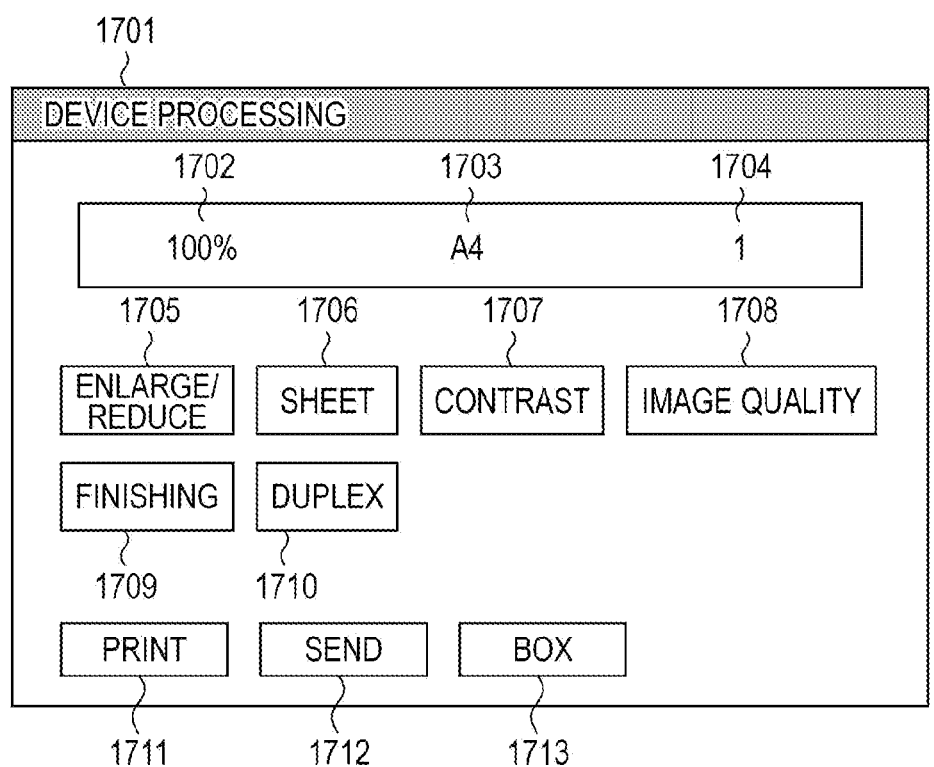
FIG. 17 is a diagram illustrating an example of a user interface which can be displayed with the image forming apparatus according to the present embodiment.

Also, in the case that a user authentication result determined by the overall processing unit 117 is an authentication success, the workflow is transitioned to display a later described workflow definition screen 1201 (FIG. 12), or a later-described test workflow executing screen 1301 (FIG. 13), or a later-described processing executing screen 1701 (FIG. 17).

Workflow Definition Screen

Next, description will be made regarding the workflow definition screen 1201, with reference to FIG. 12. FIG. 12 is a diagram illustrating an example of a user interface which can be displayed with the image forming apparatus according to the present embodiment. This example is a process example of workflow definition processing with the image forming apparatus 101 shown in FIG. 1. Also, the steps are realized by the CPU 301 shown in FIG. 3 executing a control program loaded to the RAM 302.

Figure 12:
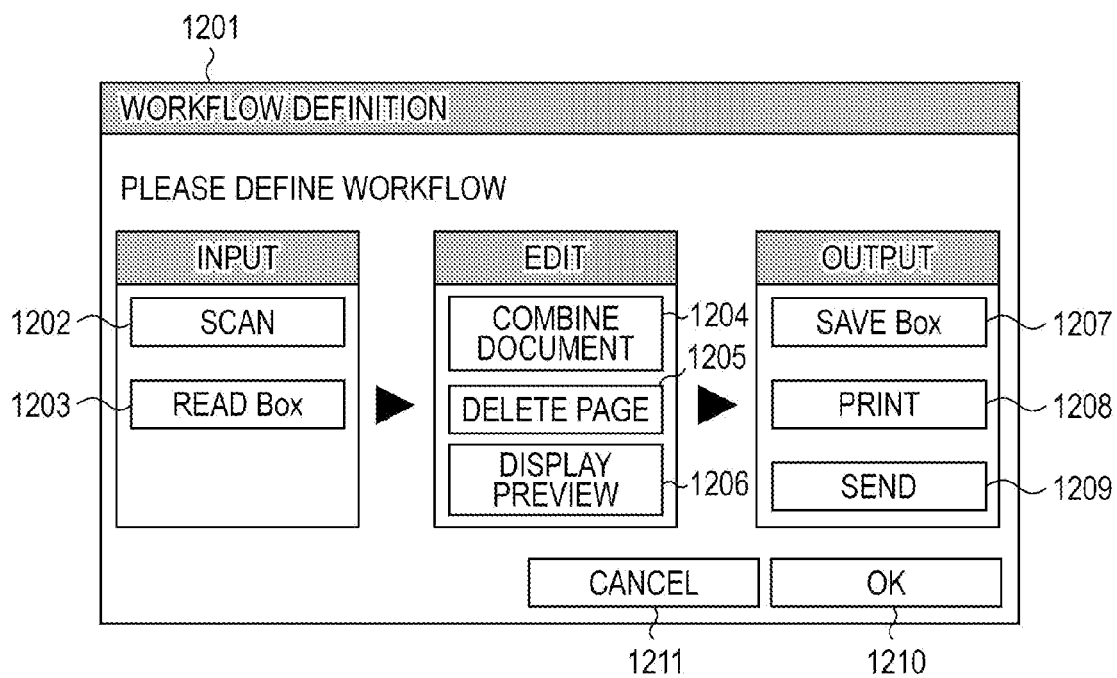
FIG. 12 is a diagram illustrating an example of a user interface which can be displayed with the image forming apparatus according to the present embodiment.

In FIG. 12, the workflow definition screen 1201 has displayed therein a scan button 1202, a read Box button 1203, a combine document button 1204, a delete page button 1205, a display preview button 1206, and so forth. Further displayed on the workflow definition screen 1201 are a save Box button 1207, print button 1208, send button 1209, OK button 1210, cancel button 1211, and so forth.

Note that a file server reception button, help button, and so forth, for example, may be added to the workflow definition screen 1201.

The scan button 1202 is a button pressed at the time of the user selecting scanning as the input for the workflow definition. In the event that the scan button 1202 has been pressed, the input of workflow definition is taken as scan, a scan setting dialog screen is displayed, and the user can perform scan settings. Upon the user inputting scan settings, scan processing is set as the input of the workflow definition.

The read Box button 1203 is a button pressed at the time of the user selecting scanning as the input for the workflow definition. In the event that the read Box 1203 has been pressed, the input of workflow definition is taken as read Box, a Box reading setting dialog screen is displayed, and the user can perform Box reading settings. Upon the user inputting Box reading settings, read Box processing is set as the input of the workflow definition. Note that read Box processing means processing for reading out data stored in a Box.

The combine document button 1204 is a button pressed at the time of the user selecting document combining as the editing for the workflow definition. In the event that the combine document 1204 has been pressed, the editing of workflow definition is taken as combine document, a document combining setting dialog screen is displayed, and the user can perform document combining settings. Upon the user inputting document combining settings, combine document processing is set as the editing of the workflow definition. Note that combine document processing means processing for reading out data stored in a Box.

The delete page button 1205 is a button pressed at the time of the user selecting deleting a page as the editing for the workflow definition. In the event that the delete page button 1205 has been pressed, the editing of workflow definition is taken as delete page, a page deletion setting dialog screen is displayed, and the user can perform page deletion settings. Upon the user inputting page deletion settings, delete page processing is set as the editing of the workflow definition.

The display preview button 1206 is a button pressed at the time of the user selecting previewing as the editing for the workflow definition. In the event that the display preview button 1206 has been pressed, the editing of workflow definition is taken as preview, a preview setting dialog screen is displayed, and the user can perform preview settings. Upon the user inputting preview settings, preview processing is set as the editing of the workflow definition.

The save Box button 1207 is a button pressed at the time of the user selecting save Box as the output for the workflow definition. In the event that the save Box button 1207 has been pressed, the output of workflow definition is taken as save Box, a save Box setting dialog screen is displayed, and the user can perform save Box settings. Upon the user inputting save Box settings, save Box processing is set as the output of the workflow definition.

The print button 1208 is a button pressed at the time of the user selecting printing as the output for the workflow definition. In the event that the print button 1208 has been pressed, the output of workflow definition is taken as printing, a print setting dialog screen is displayed, and the user can perform printing settings. Upon the user inputting printing settings, print processing is set as the output of the workflow definition.

The send button 1209 is a button pressed at the time of the user selecting sending as the output for the workflow definition. In the event that the send button 1209 has been pressed, the output of workflow definition is taken as sending, a send setting dialog screen is displayed, and the user can perform sending settings. Upon the user inputting sending settings, send processing is set as the output of the workflow definition.

The OK button 1210 is a button pressed at the time of the user instructing the image forming apparatus 101 to save the workflow information selected at the workflow definition screen 1201 at the image forming apparatus 101. In the event that the OK button 1210 has been pressed, the overall processing unit 117 obtains the workflow information which the user has input at the workflow definition screen 1201.

The cancel button 1211 is a button pressed at the time of the user instructing the image forming apparatus 101 not to save the workflow information selected at the workflow definition screen 1201 at the image forming apparatus 101, and to cancel the processing. In the event that the cancel button 1211 has been pressed, the overall processing unit 117 cancels processing, and requests the display unit 116 to display the login screen 1101.

Test Workflow Executing Screen

Next, the test workflow executing screen 1301 will be described with reference to FIG. 13. FIG. 13 is a diagram illustrating an example of a user interface which can be displayed with the image forming apparatus according to the present embodiment. This example is an example of the test workflow executing screen to be displayed at the image forming apparatus 101.

Display processing of this screen is executed by the display unit 116 based on commands from the CPU 301. The keyboard 311, mouse, 312, etc., are used for input operations to this screen by the user.

In FIG. 13, the test workflow executing screen 1301 is shown including test workflow selection radio buttons 1302, workflow ID display 1303, workflow name display 1304, workflow content display 1305, an OK button 1306, cancel button 1307, and so forth.

Note that only one of the test workflow selection radio buttons 1302 can be selected. Also note that test workflow creating point-in-time display, test workflow execution point-in-time display, property button, help button, and so forth, for example, may be added to the test workflow executing screen 1301.

The test workflow selection radio buttons 1302 are pressed for the user to select a workflow regarding which test execution is desired. In the event that a test workflow selection radio button 1302 is selected, the user can select a workflow regarding which test execution is desired.

The workflow ID display 1303 is a display of workflow IDs of workflows which the user can execute, of the workflows already defined.

The workflow name display 1304 is a display of workflow names of workflows which the user can execute, of the workflows already defined. While the workflow name display 1304 is shown provided in the test workflow executing screen 1301 with the present embodiment, the workflow name display 1304 is not indispensable.

The workflow content display 1305 is a display of workflow contents of workflows which the user can execute, of the workflows already defined. While the workflow content display 1305 is shown provided in the test workflow executing screen 1301 with the present embodiment, the workflow content display 1305 is not indispensable.

The OK button 1306 is a button pressed at the time of the user instructing the image forming apparatus 101 to perform text workflow execution of the workflow information selected at the test workflow executing screen 1301 at the image forming apparatus 101.

In the event that the OK button 1306 has been pressed, the overall processing unit 117 obtains the workflow information which the user has input at the test workflow executing screen 1301.

The cancel button 1307 is a button pressed at the time of the user instructing the image forming apparatus 101 not to execute a test workflow, and to cancel the processing. In the event that the cancel button 1307 has been pressed, the overall processing unit 117 cancels processing, and requests the display unit 116 to display the login screen 1101.

Test Workflow Re-Executing Screen 1401

FIG. 14 is a diagram illustrating an example of a user interface which can be displayed with the image forming apparatus according to the present embodiment. This example is an example of the test workflow re-executing screen to be displayed at the image forming apparatus 101.

Display processing of this screen is executed by the display unit 116 based on commands from the CPU 301. The keyboard 311, mouse, 312, etc., are used for input operations to this screen by the user.

In FIG. 14, the test workflow re-executing screen 1401 displays a workflow ID display 1402, workflow name display 1403, workflow content display 1404, final execute date and time display 1405, an OK button 1406, cancel button 1407, and so forth. Note that test workflow creating point-in-time display, test workflow execution point-in-time display, property button, help button, and so forth, for example, may be added to the test workflow re-executing screen 1401.

The workflow ID display 1402 is a display of workflow IDs of test workflows regarding which test workflow execution has been instructed. While the workflow ID display 1402 is shown provided in the test workflow re-executing screen 1401 with the present embodiment, the workflow ID display 1402 is not indispensable.

The workflow name display 1403 is a display of workflow names of test workflows regarding which test workflow execution has been instructed. While the workflow name display 1403 is shown provided in the test workflow re-executing screen 1401 with the present embodiment, the workflow name display 1403 is not indispensable.

The workflow content display 1404 is a display of workflow contents of test workflows regarding which test workflow execution has been instructed. While the workflow content display 1404 is shown provided in the test workflow re-executing screen 1401 with the present embodiment, the workflow content display 1404 is not indispensable.

The final execute date and time display 1405 is a display of the final execution date and time of test workflows regarding which test workflow execution has been instructed. While the final execute date and time display 1405 is shown provided in the test workflow re-executing screen 1401 with the present embodiment, the final execute date and time display 1405 is not indispensable.

The OK button 1406 is a button pressed at the time of the user instructing the image forming apparatus 101 to perform text workflow re-execution at the image forming apparatus 101. In the event that the OK button 1406 has been pressed, the overall processing unit 117 performs text workflow re-execution since the user has instructed text workflow re-execution.

The cancel button 1407 is a button pressed at the time of the user instructing the image forming apparatus 101 not to re-execute a test workflow, and to cancel the processing. In the event that the cancel button 1407 has been pressed, the overall processing unit 117 cancels processing, and requests the display unit 116 to display the login screen 1101.

Test Workflow Execution Results Screen

Figure 15:
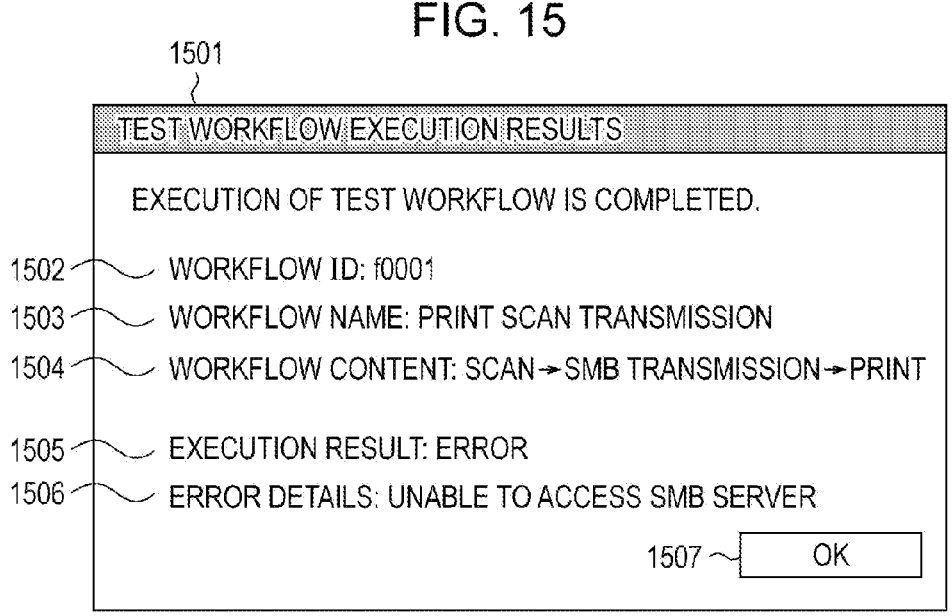
FIG. 15 is a diagram illustrating an example of a user interface which can be displayed with the image forming apparatus according to the present embodiment.

Next, the test workflow executing result screen 1501 will be described with reference to FIG. 15. FIG. 15 is a diagram illustrating an example of a user interface which can be displayed with the image forming apparatus according to the present embodiment. This example is an example of the test workflow executing results screen to be displayed at the image forming apparatus 101.

Display processing of this screen is executed by the display unit 116 based on commands from the CPU 301. The keyboard 311, mouse, 312, etc., are used for input operations to this screen by the user.

In FIG. 15, the test workflow executing results screen 1501 displays a workflow ID display 1502, workflow name display 1503, workflow content display 1504, execution result display 1505, an OK button 1506, and so forth. Note that test workflow creating point-in-time display, test workflow execution point-in-time display, property button, help button, and so forth, for example, may be added to the test workflow execution results screen 1501.

The workflow ID display 1502 is a display of workflow IDs of test workflows regarding which test workflow execution has been performed. While the workflow ID display 1502 is shown provided in the test workflow execution results screen 1501 with the present embodiment, the workflow ID display 1502 is not indispensable.

The workflow name display 1503 is a display of workflow names of test workflows regarding which test workflow execution has been performed. While the workflow name display 1503 is shown provided in the test workflow execution results screen 1501 with the present embodiment, the workflow name display 1503 is not indispensable.

The workflow content display 1504 is a display of workflow contents of test workflows regarding which test workflow execution has been performed. While the workflow content display 1504 is shown provided in the test workflow execution results screen 1501 with the present embodiment, the workflow content display 1504 is not indispensable.

The execution result display 1505 is a display of the execution results of test workflows regarding which test workflow execution has been performed. The error detail display 1506 is a display of error details of a test workflow regarding which test workflow execution has been performed. The error detail display 1506 is displayed only in the event that an error has occurred at the time of test workflow execution.

The OK button 1507 is a button pressed at the time of the user indicating confirmation of the test workflow execution results at the test workflow execution results screen 1501, to the image forming apparatus 101.

In the event that the OK button 1507 has been pressed, the overall processing unit 117 assumes that the user has confirmed the test workflow execution results, and in the event that the test workflow has ended successfully, ends processing.

Also, in the event that the test workflow ends in error, the overall processing unit 117 requests the display unit 116 to display the later-described error handling screen 1601 (shown in FIG. 16).

Error Handling Screen

Next, the error handling screen 1601 will be described with reference to FIG. 16. FIG. 16 is a diagram illustrating an example of a user interface which can be displayed with the image forming apparatus according to the present embodiment. This example is an example of the error handling screen to be displayed at the image forming apparatus 101.

Display processing of this screen is executed by the display unit 116 based on commands from the CPU 301. The keyboard 311, mouse, 312, etc., are used for input operations to this screen by the user.

Figure 16:
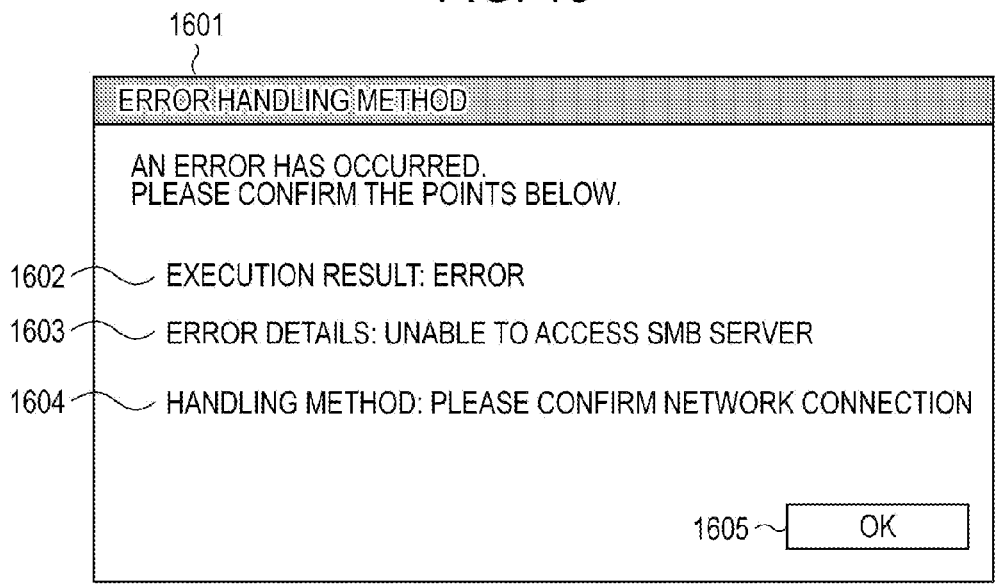
FIG. 16 is a diagram illustrating an example of a user interface which can be displayed with the image forming apparatus according to the present embodiment.

In FIG. 16, the error handling screen 1601 displays an execution result display 1602, error details display 1603, handling method display, 1604, an OK button 1605, and so forth. Note that workflow ID display, workflow name display, workflow content display, test workflow creating point-in-time display, test workflow execution point-in-time display, property button, help button, and so forth, for example, may be added to the error handling screen 1601.

The execution result display 1602 is a display of execution results of test workflows regarding which test workflow execution has been performed. The error detail display 1603 is a display of error details of a test workflow regarding which test workflow execution has been performed.

The handling method display 1604 is a display of a method for handling the error at the time of test workflow execution. The OK button 1605 is a button pressed at the time of the user indicating confirmation of the error handling method at the error handling screen 1601, to the image forming apparatus 101. In the event that the OK button 1605 has been pressed, the overall processing unit 117 assumes that the user has confirmed the error handling method, and ends processing.

Second Embodiment

The workflow test system according to the second embodiment differs from the workflow test system according to the first embodiment in that, in addition to the test workflow creation processing thereof, effective test workflow creation is performed using history of processing performed at the image forming apparatus.

That is to say, with the workflow test system according to the second embodiment, in the event that a process for performing the same processing as processing performed in the past is included in the processes of the workflow, a test workflow is created from which that process is omitted.

Accordingly, testing of a process which has been executed in the past is not performed, enabling efficient testing of workflows to be performed.

Figure 9:
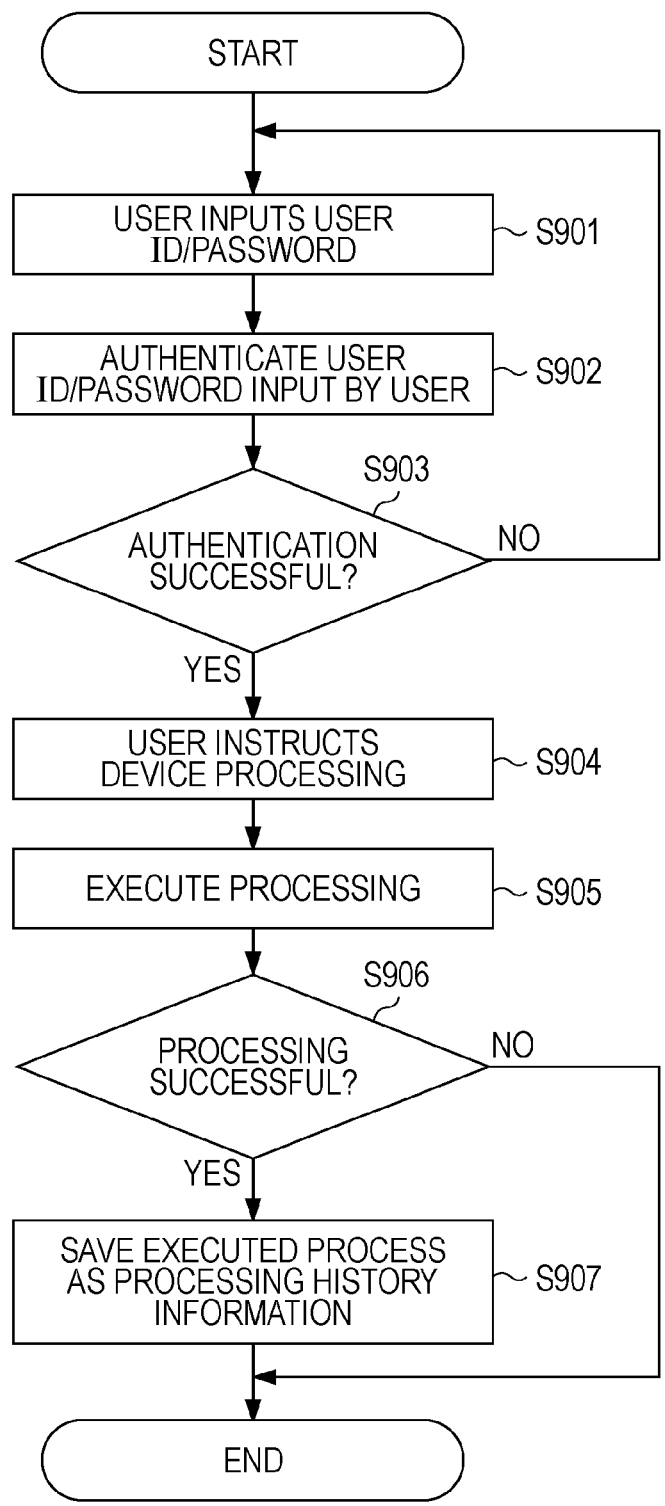
FIG. 9 is a flowchart showing an example of a fifth data processing sequence with the image forming apparatus according to the present embodiment.
Figure 10:
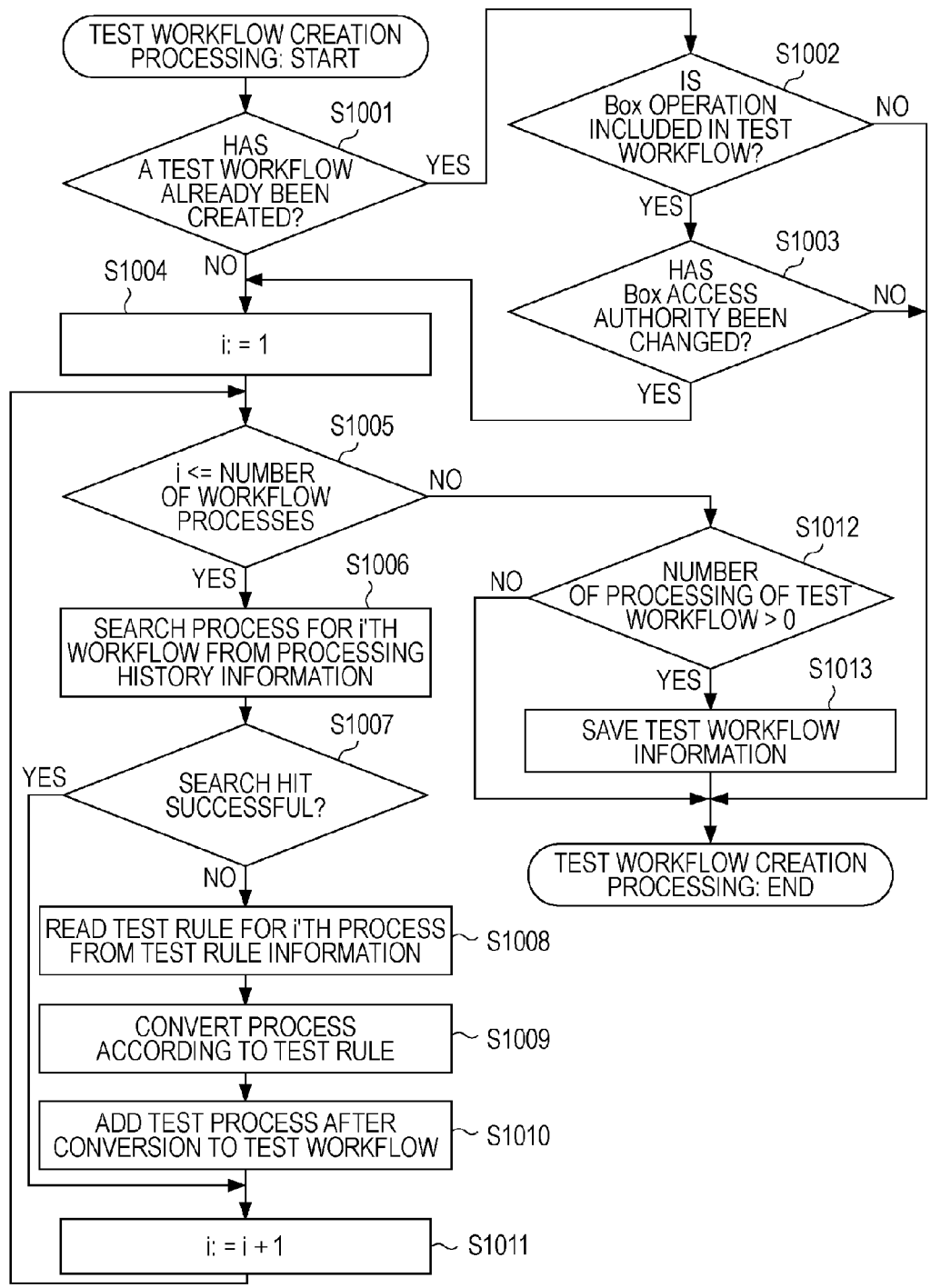
FIG. 10 is a flowchart showing an example of a sixth data processing sequence with the image forming apparatus according to the present embodiment.

The second embodiment is the same embodiment as the first embodiment except for the point that the processing at the test workflow creation executing unit 118 is different, FIG. 7 is different, and FIGS. 9 and 17 are added. FIG. 10 in the second embodiment replaces FIG. 7 in the first embodiment. FIGS. 9 and 17 in the second embodiment are added to the first embodiment.

Overall Configuration Diagram of Workflow Test System

First, the configuration of the present workflow test system will be described with reference to FIG. 1, regarding only the portions which differ from the first embodiment.

In FIG. 1, the test workflow creation executing unit 118 performs the following processing regarding the test workflow creating processing. The test workflow creation executing unit 118 sends workflow information received from the overall processing unit 117 to the test workflow information managing unit 112, and requests reading out of test workflow information corresponding to the workflow information stored in the test workflow information storage unit 105. In the event of receiving test workflow information, determination is made regarding whether or not a BOX operation is included in the test workflow processes.

In the event that a BOX operation is included in the test workflow processes, the user information and BOX information is sent to the BOX information managing unit 114, and reading of corresponding BOX information stored in the BOX information storage unit 107 is requested. Determination is then made regarding whether or not the executing user has been changed from the changing point-in-time of the BOX information which has been read out, and if not changed, the test workflow is not executed.

On the other hand, in the event that no test workflow information is read out, one process at a time is read out from the workflow information, and the following processing is performed.

Specifically, process information and user information are sent to the processing history information managing unit 113, and a request is made such that, of the processing history information stored in the processing history information storage unit 106, processing history information regarding which the user ID in the user information is the executing user and also the processing of the process is in processing history, is read out.

In the event that search results of the processing history information from the processing history information managing unit 113 are received and the search results show that processing history information exists wherein the process information and user information match, this workflow step is excluded from the test workflow.

In the event that search results of the processing history information received from the processing history information managing unit 113 show that processing history information wherein the process information and user information match does not exist, this workflow step is included in the test workflow.

That is to say, the test rule information managing unit 111 is requested to read out a test rule corresponding to the process that is stored in the test rule information storage unit 104. The test rule information received from the test rule information managing unit 111 is used for conversion into a test process and the post-conversion processing is added to the test workflow.

Following conversion of all processes of the workflow information into a test workflow, the created test workflow is sent to the test workflow information managing unit 112, which is requested to send to the test workflow information storage unit 105.

Flowchart at Image Forming Apparatus for Test Workflow Creation Execution

Next, workflow defining processing by the image forming apparatus 101 will be described with reference to FIG. 9. FIG. 9 is a flowchart showing an example of a fifth data processing sequence with the image forming apparatus according to the present embodiment. The present example is a sequence example of device processing by the image forming apparatus 101.

Note that S901 through S906 denote each step. Also, each step is realized by executing a control program loaded in the RAM 302 with the CPU 301 shown in FIG. 3.

First, the overall processing unit 117 requests the display unit 116 to display the later-described login screen 1101 (shown in FIG. 11), as shown in FIG. 9.

Next, in step S901, the user inputs a user ID 1102 and a password at the password input box 1103 in the later-described login screen 1101 (shown in FIG. 11) and presses the OK button 1104, and the workflow advances to step S902.

The overall processing unit 117 obtains the user ID and password which the user has input in step S901. The overall processing unit 11 sends the obtained user ID to the user information managing unit 109, and requests the user information managing unit 109 to read the user information corresponding to the user ID, stored in the user information storage unit 102.

The user information managing unit 109 reads the user information corresponding to the received user ID from the user information from the user information storage unit 102, and sends this to the overall processing unit 117.

The overall processing unit 117 uses the received user information and the password input by the user in step S901 to perform authentication of the user ID and password (S902).

The overall processing unit 117 then determines whether or not user information corresponding to the user ID is stored in the user information storage unit 102, and whether the password in the read user information matches the password input by the user obtained in step S901. In the case that determination is made that these match, the authentication is determined to be a success.

In step S903, the overall processing unit 117 determines whether or not the result of authentication of the user ID and password is successful. In the event of determination that authentication has failed, the flow returns to step S901.

On the other hand, in the event that the overall processing unit 117 determines that authentication has succeeded, the flow proceeds to step S904. Here, we will assume that that the overall processing unit 117 has determined that authentication has succeeded, and the flow proceeds to step S904.

The overall processing unit 117 then requests the display unit 116 to display the later-described device processing executing screen 1701 (shown in FIG. 17). Next, in step S904, the user makes device processing settings at the later-described device processing executing screen 1701 (shown in FIG. 17), presses one of the print button 1711, send button 1712, and Box button 1713, and the flow proceeds to step S905.

The overall processing unit 117 obtains the device processing setting information which the user has input at the later-described device processing executing screen 1701 (shown in FIG. 17) in the above step S904. Then in step S905, the overall processing unit 117 executes device processing in accordance with obtained device processing setting information, and the flow proceeds to step S906.

In step S906, the overall processing unit 117 determines whether or not the result of performing device processing has been successful. In the event that the overall processing unit 117 makes determination here that the result of performing device processing has been successful, the flow proceeds to step S907.

On the other hand, in the event that the overall processing unit 117 determines that the result of performing device processing has not been successful, the flow ends.

The overall processing unit 117 then sends device processing information performed in step S905, user information, and current point-in-time, to the processing history information managing unit 113.

In step S907 the processing history information managing unit 113 then stores the received device processing information, user information, and current point-in-time, in the processing history information recording unit 106 as processing history information, sends a message to the effect that this has been stored to the overall processing unit 117, and the processing ends.

Flowchart of Sub-Routine to Create Test Workflow

Next, the test workflow creation processing with the image forming apparatus 101 will be described with reference to FIG. 10. FIG. 10 is a flowchart showing an example of a sixth data processing sequence with the image forming apparatus according to the present embodiment. The present example is a sequence example of test workflow creation processing by the image forming apparatus 101. Note that this test workflow creation processing is detailed processes of sub-routine processing executed in step S606 in FIG. 6.

Note that S1001 through S1013 denote each step. Also, each step is realized by executing a control program loaded in the RAM 302 with the CPU 301 shown in FIG. 3.

As shown in FIG. 10, at the image forming apparatus 101, first, the test workflow creation executing unit 118 sends the workflow information received from the overall processing unit 117 to the test workflow information managing unit 112.

The test workflow creation executing unit 118 further requests reading out of test workflow information in accordance with the workflow information. The test workflow information managing unit 112 reads the test workflow information corresponding to the workflow ID of the received workflow information from the test workflow information storage unit 105, and sends this to the test workflow creation executing unit 118.

Next, in step S1001, the test workflow creation executing unit 118 determines whether or not a test workflow has been created in accordance to the workflow information received from the overall processing unit 117.

In the case the test workflow creation executing unit 118 determines that the test workflow information readout result received from the test workflow information managing unit 112 is successfully read, the test workflow is determined to be already created, and the flow is advanced to step S1002.

On the other hand, in the case the test workflow creation executing unit 118 determines in step S1001 that the test workflow information readout result received from the test workflow information managing unit 112 is not successfully read, the test workflow is determined not to have been created, and the workflow is advanced to step S1004.

Here, we assume that the test workflow creation executing unit 118 has determined that there is already a test workflow created, and the flow is advanced to step S1002.

In step S1002, the test workflow creation executing unit 118 references the test workflow definition of the test workflow information received in step S1001, and determines whether or not a BOX operation is included in the process of the workflow definition shown in the test workflow definitions.

In the case the test workflow creation executing unit 118 determines that a BOX operation is included in the test workflow definitions, the flow is advanced to step S1003.

On the other hand, in the case the test workflow creation executing unit 118 determines in step S1002 that a BOX operation is not included in the test workflow definitions, the present processing is ended. Here, we assume that the test workflow creation executing unit 118 has determined that a BOX operation is included in the test workflow definitions, and the flow is advanced to step S1003.

In step S1003, following the test workflow received in step S1001 being executed in the past, the test workflow creation executing unit 118 determines whether or not the access right of the BOX has been changed (S1003).

First, the test workflow creation executing unit 118 references the executing time of the test workflow received in step S1001. In the case there is an execution time, the test workflow creation executing unit 118 obtains a BOX for the BOX operation of the workflow information received from the overall processing unit 117 in step S1001.

The test workflow creation executing unit 118 then sends the obtained BOX information to the BOX information managing unit 114, and requests reading of the BOX information corresponding to the BOX name of the BOX information from the BOX information storage unit 107.

The test workflow creation executing unit 118 then reads the BOX information corresponding to the BOX name in the received BOX information from the BOX information storage unit 107, and sends this to the test workflow creation executing unit 118.

The test workflow creation executing unit 118 then compares the changing time of the received BOX information and the executing time of the test workflow information received in step S1001. In the case that there is an executing time of the test workflow received in step S1001, and the executing time is later than the changing time of the BOX information, the test workflow creation executing unit 118 determines that the access right of the BOX has not been changed, and the process is ended.

On the other hand, in the event that the above determination does not hold true in step S1003, the test workflow creation executing unit 118 determines that the access right of the BOX has been changed. Here, we will assume that the test workflow creation executing unit 118 has determined that the access right of the BOX has been changed, and the flow advances to step S1004.

In step S1004, the test workflow creation executing unit 118 initializes the value of the pointer variable i indicating a process to configure the workflow definitions of the workflow information received in step S1001 to "1", and the flow is advanced to step S1005.

Next, in step S1005, the test workflow creation executing unit 118 determines whether or not the value of the pointer variable i indicating a process to configure the workflow definitions is at or less than the number of processes of the workflow definition.

Specifically, in the case that the test workflow creation executing unit 118 determines that the value of the pointer variable i indicating a process to configure the workflow definitions is at or less than the number of processes of the workflow definition, the flow is advanced to step S1006.

On the other hand, in the case that the test workflow creation executing unit 118 determines that the value of the pointer variable i indicating a process to configure the workflow definitions is not at or less than the number of processes of the workflow definition, the flow is advanced to step S1012.

Here, we assume that the test workflow creation executing unit 118 has determined that the value of the pointer variable i indicating a process to configure the workflow definitions is at or less than the number of processes of the workflow definition, and the flow is advanced to step S1006.

Here, the test workflow creation executing unit 118 sends the i'th process information of the workflow definition of the workflow information received in step S1001 to the processing history information managing unit 113.

Next, the test workflow creation executing unit 118 requests the processing history information managing unit 113 to read out, of the processing history information stored in the processing history information recording unit 106, processing history information of which the user ID of the user information is equal to the executing user, and also the processing of steps is equal to the processing history.

In step S1006, the processing history information managing unit 113 reads out, of the processing history information stored in the processing history information recording unit 106, processing history information of which the user ID of the user information is equal to the executing user, and also the processing of steps is equal to the processing history. Further, the processing history information managing unit 113 sends the results of reading the processing history information to the test workflow creation executing unit 118, and the flow advances to step S1007.

In step S1007, the test workflow creation executing unit 118 determines whether or not searching of read results of processing history information received from the processing history information managing unit 113 has been successful. In the event that the test workflow creation executing unit 118 determines that searching of read results of processing history information has been successful, the flow advances to step S1011.

On the other hand, in the event that the test workflow creation executing unit 118 determines that searching of read results of processing history information has not been successful, the flow advances to step S1008. Here, we will assume that the test workflow creation executing unit 118 has determined that searching of read results of processing history information has not been successful, and the flow advances to step S1008.

The test workflow creation executing unit 118 then sends the i'th process information of the workflow definition of the workflow information received in step S1001 to the test rule information managing unit 111.

Further, reading of the test rule information having a step type corresponding to the processing of the i'th process, from the test rule information storage unit 104, is requested. In step S1008, the test rule information managing unit 111 reads out test rule information having a step type corresponding to the i'th process from the test rule information storage unit 104 and sends this to the test workflow creation executing unit 118, and the flow is advanced to step S1009.

Next, in step S1009, the test workflow creation executing unit 118 converts the i'th process of the workflow definitions of the workflow information received in step S1001 into a test process for the test rule information received in step S1008, and the flow is advanced to step S1010.

In step S1010, the test workflow creation executing unit 118 adds the data process converted in step S1009 to the test workflow, and the flow is advanced to step S1011.

Next, in step S1011, the test workflow creation executing unit 118 increments the value of the pointer variable i indicating the process making up the workflow definitions by "1", and returns the flow to step S1005.

Thus, with the present embodiment, a test workflow is generated by adding processes generated following test rules stored in the test rule information storage unit 104. At this time, determination regarding whether or not there is a need to add the generated processes to the test workflow is determined based on the history information at the processing history information recording unit 106.

In the event that determination is made that there is no need to add a process being created, a test workflow can be reacted which does not include a process being executed in the test workflow.

Accordingly, wasteful processing wherein a process which is successfully being executed is further tested at the time of executing a test workflow, due to processes previously successfully executed in the workflow system also being included in the test workflow and run, can be done away with.

Also, with the present embodiment, even in the event that reading of a file from a Box has been successful in the past for example, whether or not to add the process of reading of a file from the Box to the test workflow is determined based on whether or not there has been change in access right. Accordingly, change of access right can be known in a test workflow beforehand.

Specifically, a general user instructs test execution of an actual workflow A (scan→SMB transmission→print) to the device.

In this case, a test workflow T is automatically generated from the actual workflow A (scan→SMB transmission→print). The image forming apparatus 101 uses the processing history information to create a test workflow T1 with the steps of the actual workflow A (scan→SMB transmission→print) regarding which processing has already succeeded, excluded. Here, in the event that the process of printing has already been executed, a test workflow T1 (scan→SMB transmission) is created.

Thus, a workflow which does not include all processes as with the related art, i.e., made up of necessary processes, can be created.

On the other hand, in the case determination is made in step S1005 that the value of the pointer variable i exceeds the number of workflow processes, the flow advances to step S1012. In step S1012, the test workflow creation executing unit 118 determines whether or not the number of test workflow processes created by adding a test process in step S1010 is greater than "0".

In the case that the test workflow creation executing unit 118 determines that the number of test workflow processes created by adding a test process in step S1010 is greater than "0", the flow is advanced to step S1013.

On the other hand, in the case that the test workflow creation executing unit 118 determines that the number of test workflow processes created by adding a test process in step S1010 is not greater than "0", the processing is ended. Here, let us assume that the test workflow creation executing unit 118 has determined that the number of test workflow processes created by adding a test process in step S1010 is greater than "0", so the flow is advanced to step S1013.

In step S1013, the test workflow creation executing unit 118 sends the test workflow created by adding the test process in step S1010, to the test workflow information managing unit 112, and requests to store this in the test workflow information storage unit 105.

The test workflow information managing unit 112 then stores the received test workflow information in the test workflow information storage unit 105, sends information to the effect that storage is performed to the test workflow creation executing unit 118, and the flow is ended.

Accordingly, a test workflow excluding steps of processing which have already succeeded is created at the time of a general user executing an actual workflow test, using the history of processing executed at the device (processing history information). Further, the test workflow can be created not exactly the same as the steps of the actual workflow, but by combining steps following predefined rules.

Thus, a general user can effectively confirm whether a defined workflow can be correctly executed, without executing all steps in the workflow.

Device Processing Screen

Next, description will be made regarding the device processing screen 1701, with reference to FIG. 17. FIG. 17 is a diagram illustrating an example of a user interface which can be displayed with the image forming apparatus according to the present embodiment. This example is an example of a device processing screen displayed with the image forming apparatus 101.

Display processing of this screen is executed by the display unit 116 based on commands from the CPU 301. The keyboard 311, mouse 312, etc., are used for input operations to this screen by the user.

In FIG. 17, the device processing screen 1701 has displayed therein an enlargement/reduction display 1702, sheet display 1703, number of copies display 1704, enlargement/reduction button 1705, sheet button 1706, contrast button 1707, and so forth.

The device processing screen 1701 also displays an image quality button 1708, finishing button 1709, duplex button 1710, print button 1711, send button 1712, Box button 1713, and so forth. Also, the device processing screen 1701 may be provided with, for example, an original state display, shortcut execution button, help button, etc.

The enlargement/reduction display 1702 displays the enlargement/reduction set at the time of the user pressing the later-described enlargement/reduction button 1705. While the enlargement/reduction display 1702 has been provided on the device processing screen 1701 according to the present embodiment, the enlargement/reduction display 1702 is not indispensable.

The sheet display 1703 displays the sheet set at the time of the user pressing the later-described sheet button 1706. While the sheet display 1703 has been provided on the device processing screen 1701 according to the present embodiment, the sheet display 1703 is not indispensable.

The number of copies display 1704 displays the sheet set at the time of the user pressing the later-described sheet button 1706. While the number of copies display 1704 has been provided on the device processing screen 1701 according to the present embodiment, the number of copies display 1704 is not indispensable.

The enlargement/reduction button 1705 is a button for the user to set enlargement/reduction at the time of scanning or printing, as a device processing setting. The sheet button 1706 is a button for the user to set sheets and the number of copies at the time of printing, as a device processing setting.

The contrast button 1707 is a button for the user to set contrast at the time of scanning, as a device processing setting.

The image quality button 1708 is a button for the user to set image quality at the time of scanning, as a device processing setting. The finishing button 1709 is a button for the user to perform finishing settings at the time of printing, as a device processing setting.

The duplex button 1710 is a button for the user to make duplex settings at the time of scanning and printing, as a device processing setting. The print button 1711 is a button for the user to set printing and instruct printing, as a device processing setting.

The send button 1712 is a button for the user to set sending and instruct sending, as a device processing setting. The BOX button 1713 is a button for the user to make BOX operation settings and instruct BOX operations, as a device processing setting.

Third Embodiment

With the above-described second embodiment, description has been made regarding a case wherein processing is performed so that processes regarding which a search has hit upon are not added to a test workflow, at the time of a general user creating a test workflow.

Now, an arrangement may be made wherein the processing of the first embodiment and the second embodiment are switched between by recognizing attributes of the user regarding which authentication is to be made, regarding whether an administrating user or a general user.

That is to say, an arrangement may be made wherein a case in which a test workflow including all processes which an administrating user has created is to be executed, and a case in which a test workflow not including processes unnecessary for the user to execute is to be executed, are freely switched between in the creating mode. For example, one of the creating modes can be determined at the point of authentication. Accordingly, demands for creating test workflows by administrative users and general users can be answered in a convenient manner.

Fourth Embodiment

The following is a description of the configuration of data processing programs readable with the image forming apparatus according to the present invention, with reference to the memory map shown in FIG. 18. FIG. 18 is a diagram for describing the memory map of a storage medium storing various types of data processing programs readable with the image forming apparatus according to the present invention.

Note that while not illustrated in particular, there may be cases wherein information for managing a program group stored in the storage medium, such as version information, author information, etc., for example, and information dependent on the side reading out the programs such as an OS (operating system) or the like, such as icons for displaying programs in an identifiable manner and so forth, are also stored in the storage medium.

Further, data subject to the various types of programs is also managed in the above directory. Also, programs for installing the various types of programs in the computer, programs for decompressing compressed programs to be installed, and so forth, may also be stored therein.

Also, the functions shown in FIGS. 5 through 10 in the present embodiment may be executed by a host computer, with a program externally installed. In this case, the present invention is also applicable to cases wherein information groups including programs are supplied to an output device from storage media such as CD-ROM or flash memory or FD (floppy disks) or the like, or from an external storage medium via a network.

In this way, a recording medium recording program code for software which realizes the functions of the above-described embodiments is supplied to a system or apparatus. It is needless to say that the objects of the present invention are also achieved by the computer (or CPU or MPU) of the system or apparatus reading out and executing the program code stored in the storage medium.

In this case, the program code itself read out from the storage medium realizes the new functions of the present invention, and the storage medium storing the program code makes up the present invention.

Accordingly, object code, programs executed with an interpreter, script data supplied to an OS, and so forth may be used, so long as having the functions of a program.

The storage medium to supply the program may be, for example, a flexible disk, hard disk, optical disc, magneto-optical disk, MO, CD-ROM, RD-R, CD-RW, magnetic tape, non-volatile memory card, ROM, DVD, and so forth.

In this case, the program code itself read out from the storage medium realizes the new functions of the above-described embodiments, and the storage medium storing the program code makes up the present invention.

As another program supply method, there is a method to connect to an Internet home page using a browser of a client computer. The computer program of the present invention itself, or a file which is compressed and includes a self-installing function, can be supplied by downloading to the storage medium such as a hard disk. Also, the program code configuring the program of the present invention can be divided into multiple files, and these files can be downloaded from different home pages. That is to say, a WWW server or ftp server or the like from which multiple users download a program file for realizing the functional processing of the present invention is also included in the scope of the present invention.

Also, the program of the present invention can be encrypted and stored in a storage medium such as a CD-ROM and distributed to users, and allow users who have cleared predetermined conditions to download the key information to solve the encryption from the home page via the Internet. By using the key information, an encrypted program can be realized by executing the program upon installation in a computer.

Also, the present invention is not restricted to the functions of the above-described embodiments being realized by the computer executing the program which has been read. For example, it is needless to say that this includes a case wherein, based on the instructions of the program, the OS operating on a computer performs part or all of the actual processing, whereby the functions of the above-described embodiments are be realized.

Further, the program read out from the storage medium is written into memory associated with a function expansion unit which is connected to the computer or a function expansion board inserted in the computer. It is needless to say that this includes a case wherein, based on the program instructions, a CPU or the like associated with the function expansion board or function expansion unit can perform part or all of the actual processing, and the functions of the above-described embodiments can be realized by the processing thereof.

The present invention is not restricted to the above embodiments; rather, various modifications (including organic combinations of the embodiments) based on the spirit of the present invention may be made, which are not to be excluded from the scope of the present invention.

While the present invention has been described with reference to various examples and embodiments, it will be clear to one skilled in the art that the spirit and scope of the present invention is not restricted specific descriptions in the present Specification.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-182144 filed Jul. 11, 2007, which is hereby incorporated by reference herein in its entirety.

What is claimed is:

1. An information processing apparatus configured to execute a workflow including a plurality of processes and hold history information of the workflow, the information processing apparatus comprising:
   an instructing unit configured to instruct such that a test workflow regarding a workflow selected to be executed is executed;
   a generating unit configured to generate a first test workflow regarding the selected workflow;
   an executing unit configured to execute the first test workflow regarding the selected workflow;
   a first determination unit configured to determine whether the first test workflow has been executed or not after determining the first test workflow regarding the selected workflow has been stored;
   a second determination unit configured to determine whether an access right of a storage region which is used for a storing process comprised in the selected workflow is changed or not after determining the first test workflow regarding the selected workflow has stored; and
   a display control unit configured to display a selecting screen to accept that the first test workflow is to be executed again or not when the first determination unit determines that the first test workflow has been executed,
   wherein the executing unit executes the first test workflow when re-executing of the first test workflow is accepted by using the selecting screen,
   wherein the generating unit generates a second test workflow for the selected workflow when the second determination unit determines that the access right of the storage region is changed, the generating unit generates the second test workflow at least by adding a process not held in history information to processes of the second test workflow, without adding a process held in the history information to the processes of the second test workflow, and
   wherein the executing unit executes the second test workflow generated by the generating unit.

2. The information processing apparatus according to claim 1, wherein, when the workflow includes a process of reading data from the storage region, the generating unit determines not to add the process of reading data from the storage region to the second test workflow when the change to the access right is made before the process of reading data from the storage region is executed, and wherein the generating unit determines to add the process of reading data from the storage region to the second test workflow when the change to the access right is made after the process of reading data from the storage region is executed.

3. A control method for an information processing apparatus configured to execute a workflow including a plurality of processes and hold history information of the workflow, the control method comprising:
   instructing such that a test workflow regarding a workflow selected to be executed is executed;
   generating a first test workflow regarding the selected workflow;
   executing the first test workflow regarding the selected workflow;
   determining whether the first test workflow has been executed or not after determining the first test workflow regarding the selected workflow has been stored;
   determining whether an access right of a storage region which is used for a storing process comprised in the selected workflow is changed or not after determining the first test workflow regarding the selected workflow has been stored; and
   performing control to display a selecting screen to accept that the first test workflow is to be executed again or not when it is determined that the first test workflow has been executed,
   wherein the executing step further comprises executing the first test workflow when re-executing of the first test workflow is accepted by using the selecting screen,
   wherein the generating step further comprises generating a second test workflow for the selected workflow when it is determined that the access right of the storage region is changed, the generating step comprising generating the second test workflow at least by adding a process not held in history information to processes of the second test workflow, without adding a process held in the history information to the processes of the second test workflow, and wherein the executing step further comprises executing the second test workflow generated in the generating step.

4. A non-transitory computer-readable storage medium wherein a control program is stored for an information processing apparatus configured to execute a workflow including a plurality of processes and hold history information of the workflow, the control program configured to execute a method comprising:

instructing such that a test workflow regarding a workflow selected to be executed is executed;

generating a first test workflow regarding the selected workflow;

executing the first test workflow regarding the selected workflow;

determining whether the first test workflow has been executed or not after determining the first test workflow regarding the selected workflow has been stored;

determining whether an access right of a storage region which is used for a storing process comprised in the selected workflow is changed or not after determining the first test workflow regarding the selected workflow has been stored; and performing control to display a selecting screen to accept that the first test workflow is to be executed again or not when it is determined that the first test workflow has been executed, wherein the executing step further comprises executing the first test workflow when re-executing of the first test workflow is accepted by using the selecting screen, wherein the generating step further comprises generating a second test workflow for the selected workflow when it is determined that the access right of the storage region is changed, the generating step comprising generating the second test workflow at least by adding a process not held in history information to processes of the second test workflow, without adding a process held in the history information to the processes of the second test workflow, and wherein the executing step further comprises executing the second test workflow generated in the generating step.

* * * * *